(12) United States Patent
Das et al.

(10) Patent No.: US 9,848,373 B2
(45) Date of Patent: Dec. 19, 2017

(54) METHOD AND TERMINAL FOR GSM CELL SEARCHES

(71) Applicant: Telefonaktiebolaget L M Ericsson (publ), Stockholm (SE)

(72) Inventors: Sajal Kumar Das, Bangalore (IN); Christopher Callender, Kinross (GB); Shiva Kumar Gundappa, Bangalore (IN)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/423,103

(22) PCT Filed: Oct. 17, 2014

(86) PCT No.: PCT/EP2014/072325
§ 371 (c)(1),
(2) Date: Feb. 20, 2015

(87) PCT Pub. No.: WO2015/144258
PCT Pub. Date: Oct. 1, 2015

(65) Prior Publication Data
US 2016/0262089 A1 Sep. 8, 2016

Related U.S. Application Data

(60) Provisional application No. 61/969,603, filed on Mar. 24, 2014.

(51) Int. Cl.
*H04W 48/16* (2009.01)
*H04W 36/00* (2009.01)
(Continued)

(52) U.S. Cl.
CPC ....... *H04W 48/16* (2013.01); *H04W 36/0088* (2013.01); *H04W 72/0446* (2013.01); *H04W 72/12* (2013.01); *H04W 88/06* (2013.01)

(58) Field of Classification Search
CPC ......... H04W 36/0083; H04W 36/0088; H04W 48/16; H04W 72/0446; H04W 72/12; H04W 88/06
See application file for complete search history.

(56) References Cited

U.S. PATENT DOCUMENTS 6,587,695 B1 7/2003 Jyrkka et al.
8,406,789 B1 * 3/2013 Thompson ........... H04B 7/2125
370/315
(Continued)

OTHER PUBLICATIONS

Durastante, G. et al. "An efficient monitoring strategy for intersystem handover from TD-SCDMA to GSM networks" 2002 IEEE 13th International Symposium on Personal, Indoor and Mobile Radio Communications, Sep. 15-18, 2002, IEEE, Piscataway, NJ, USA, vol. 4, Sep. 15, 2002, pp. 1555-1560, XP010611527, ISBN: 978-0-7803-7589-5.

(Continued)

*Primary Examiner* — David B. Lugo
(74) *Attorney, Agent, or Firm* — Leffler Intellectual Property Law, PLLC

(57) ABSTRACT

It is presented a method for Global System for Mobile communications, GSM, cell searches. The method is performed in a wireless terminal of a cellular network when the wireless terminal is active in a non-GSM radio access technology and comprising the steps of: scheduling reception of a part of a frame burst of a GSM frequency in said cellular network for said wireless terminal; searching digital samples received on said GSM frequency for a predefined logical channel pattern. A corresponding wireless terminal, computer program and computer program product are also presented.

35 Claims, 8 Drawing Sheets

(51) Int. Cl.
*H04W 72/04* (2009.01)
*H04W 72/12* (2009.01)
*H04W 88/06* (2009.01)

(56) References Cited

U.S. PATENT DOCUMENTS

| | | | |
|---|---|---|---|
| 2004/0132457 A1* | 7/2004 | Sanders | H04W 24/08 455/450 |
| 2007/0037601 A1 | 2/2007 | Mittal et al. | |
| 2011/0207453 A1* | 8/2011 | Hsu | H04W 88/06 455/424 |
| 2011/0280141 A1 | 11/2011 | Chin et al. | |
| 2012/0071154 A1* | 3/2012 | Thompson | H04W 24/08 455/422.1 |
| 2013/0064331 A1* | 3/2013 | Das | H04L 1/08 375/341 |
| 2013/0070828 A1* | 3/2013 | Das | H04L 27/22 375/226 |
| 2013/0279353 A1 | 10/2013 | Ji et al. | |
| 2014/0355596 A1* | 12/2014 | Juncker | H04W 56/0035 370/350 |
| 2015/0092709 A1* | 4/2015 | Su | H04W 48/16 370/329 |
| 2015/0257100 A1* | 9/2015 | Su | H04W 36/0016 455/574 |

OTHER PUBLICATIONS

Mehrotra, A. "GSM System Engineering" Jan. 1, 1997, GSM System Engineering; [Artech House Mobile Communications Series], Boston, MA, Artech, US, pp. 223-227, XP002131902, ISBN: 978-0-89006-860-1.
3GPP TS 25.133 Version 11.1.0 "Requirements for support of radio resource management (FDD)" Release 11, Jun. 2012, Section 8, pp. 1-15 and 74-88.
3GPP TS 25.331 Version 11.1.0 "Readio Resource Control (RRC); Protocol Specification" Release 11, Mar. 2012, Section 10.3.6.36g, pp. 1-26 and 880-881.
Das, Sajal Kumar "Mobile handset design" Wiley, 2012, Version 1, Chapter 7, Section 7.8, pp. 1-29 and 209-255.
3GPP TS 45.002 Version 1-.3.0 "Multiplexing and multiple access on the radio path" Release 10, Mar. 2012, Section 5.2.3, pp. 1-6, 19-24.
3GPP TS 23.003 Version 12.2.0 "Technical Specification Group Core Network and Terminals; Numbering, addressing and identification", Release 12, Mar. 2014, pp. 1-87.
3GPP TS 43.059 Version 11.0.0 "Function stage 2 description of Location Services (LCS) in GERAN" Release 11, Sep. 2012, pp. 1-69.
3GPP TS 45.003 Version 9.0.0 "Channel Coding" Release 9, Dec. 2009, Section 2.1, pp. 1-16, 19-32.
3GPP TS 45.004 Version 8.0.0 "Modulation" Release 8, Dec. 2008, Section 2, pp. 1-3, 5-7.
PCT Invitation to Pay Additional Fees, mailed Feb. 5, 2015, in connection with International Application No. PCT/EP2014/072325, all pages.
3GPP TSG-RAN WG4 Meeting #70bis, R4-141936, San Jose del Cabo, Mexico, Mar. 31-Apr. 4, 2014, Ericsson, DRX measurements in cell FACH state, 4 pages.

* cited by examiner

METHOD AND TERMINAL FOR GSM CELL SEARCHES

CROSS-REFERENCE TO RELATED APPLICATIONS

This application claims the benefit of U.S. Provisional Application No. 61/969,603, filed Mar. 24, 2014, which is hereby incorporated herein by reference in its entirety.

TECHNICAL FIELD

The disclosure relates to a method, a wireless terminal, a computer program and a computer program product for GSM cell searches.

BACKGROUND

Today, globally, several types of cellular networks co-exist, like GSM (Global System for Mobile communications), WCDMA (Wideband Code Division Multiple Access), LTE (Long Term Evolution), and TDSCDMA (Time Division Synchronous Code Division Multiple Access) etc. To work seamlessly with this multiple radio access technology (RAT) network environment, mobile vendors are making mobile phones, supporting legacies as well as upcoming systems. GSM being one of the most widely deployed and used as legacy system, the support of GSM Radio Access Technology (RAT) is by-default provided in most of the Multi-RAT Mobile devices and also at the same time covered by most of the networks worldwide. Even though there are new technologies, such as LTE being deployed, there will still be LTE network coverage holes, where Mobile devices have to quickly find out the presence of GSM/legacy RAT cells and connect to the GSM/Legacy RAT network for to maintain packet switched or circuit switched calls or to be remained connected with the PLMNs (public land mobile networks).

In "An efficient monitoring strategy for intersystem handover from TD-SCDMA to GSM networks", by Durastante G, et al, in IEEE conference on Personal, Indoor and Mobile Radio Communications 2002, intersystem handover between third and second generation mobile radio systems is considered. In such a handover the user equipment has to know the timing and slot structure of a target GSM cell, which is only possible during a GSM cell-reconfiguration. US2011/280141 proposes a method to create discontinues reception (DRX) for GSM cell search before handover. This method is also dependent on a pre-known time slot structure of a GSM cell.

U.S. Pat. No. 6,587,695 proposes a method to reduce initial cell search time and distinguish between 51 and 52 multi-frames. The proposed method would require a standard change.

SUMMARY

It is an objective to improve GSM cell search time for a wireless terminal active in a non-GSM radio access technology.

In multi-RAT scenarios, a typical problem that arises is the cell search and measurement of legacy GSM cells in the back ground so that a wireless terminal (such as a mobile station-MS or a user equipment-UE) can switch (handover) to the GSM cell as when required. When a mobile station is engaged in high data rate transfer, e.g. in HSDPA (High-Speed Downlink Packet Access) or LTE connected RAT, during that time creating even a small time gap for this GSM neighbour cell measurement is very difficult, due to tight time budget, as multi-RAT mobile stations typically uses single radio frequency circuits for cost and size reduction. This means that measurements for GSM neighbour cells can then only be scheduled when radio frequency (RF) circuit is not receiving a transmission from the serving cell. That puts lot of burden on mobile station design for fast GSM neighbour cell measurement.

As a part of GSM neighbour cell measurement a mobile station (MS) has to periodically do several tasks and among these the main tasks are:

(1) RSSI (received signal strength indicator) measurements of the all the neighbour cells. Once the MS is connected to the network, then generally the network indicates the neighbour list via BCCH (Broadcast Control Channel) SIB (System Information Block). Typically, for the RSSI measurement, the MS tunes the radio frequency (RF) circuit to that particular carrier frequency (cell frequency) and collects a small number of e.g. 32 (or 16 samples for time limit) I, Q samples and measures the RSSI of a carrier. For RSSI measurement, there is no specific time slot or time window required to be received or the RF circuit to be active. Anywhere in the reception time window it is possible to measure RSSI.

(2) BSIC (Base Station Identity Code) identification and periodic reconfirmation: If a new cell is found, which is measured with a strong RSSI value e.g. an RSSI value greater than a threshold, then the MS decodes the synchronization channel (SCH) to obtain the cell identity (ID), which is denoted BSIC (base station identity code) in GSM. The BSIC consists of 6 bits, of which 3 bits are NCC (network colour code) and 3 bits are BCC (Base station Colour Code). BCC is used to identify different cells and NCC is used to identify different network providers. The NCC is normally assigned by a national or international regulatory authority and the BCC is assigned by the network operator. The BSIC is defined in GSM specification 3GPP TS 03.03 section 4.3.2. MS reads the BSIC to get to know the ID of the new cell. This process is called BSIC identification. Afterwards, once the cell is identified, the MS has to reconfirm periodically that it can still decode the same BSIC from the already identified cell, e.g. cell reconfirmation.

To perform cell identification and reconfirmation, the MS decodes the Synch Burst (SB) of the Synch Channel (SCH) and obtains the BSIC and TDMA (Time division multiple access) frame structure. In GSM, each cell has a specific broadcast frequency. In cell broadcast frequency's slot#0, the cell (or in the BTS, base transceiver station) transmits the 51-multi-frame structure, which consists of several channels appearing in a time multiplexed manner, such as FCCH (Frequency Correction Channel), SCH, BCCH, CCCH (Common Control Channel) etc. For BSIC identification, the MS would in legacy systems first search for FCCH in the broadcast frequency channel, and if FCCH is found then attempt to decode the SCH after one TDMA frame time gap. Once the SCH is decoded then the MS is able to obtain the BSIC (NCC, BCC) info and also the TDMA frame number info. Once the TDMA frame number is found for a cell, MS stores the timing information and using this information and an internal clock, the MS is aware about when the SCH and other channels will appear from that cell in the multiplexed channel structure. Using this information, for reconfirmation purpose, then MS configures its radio frequency (RF) circuitry to receive the GSM signal around the SCH (expected) time slot and receives reconfirmation of the cell.

The MS is required to search FCCH and followed by SCH for cell identification purpose, and these FCCH and SCH appear over a large time gap (10 frames e.g. 80 time slots intervals) on the cell broadcast frequency.

So, the MS will be continuously engaged to search for FCCH and SCH for such a long duration by continuously reserving its RF circuitry. This leads to several issues and problems in different scenarios like, (A) Issues in Inter-RAT (I-RAT) Scenarios, when GSM Cell Broadcast Frequency List is Known to MS:

In Multi-RAT scenarios, the wireless terminal is configured to perform an I-RAT (Inter-RAT) cell search and measurement on GSM cells, where most of the time the neighbour cell frequency list is provided by the network in the BCCH Allocation (BA) list.

(1) In the present scenario for cell identification purpose, the MS typically has to tune the RF circuit for a particular frequency and search for FCCH and SCH continuously for 11 frames, as the timing and TDMA frame structure of that new cell is not known. That indicates, as the slot number where the FCCH and SCH will be appearing over the time is unknown, so the MS should reserve the RF circuit and search for FCCH and SCH for a duration of 11*8 slots=88*577 us=50.7 ms. Generally, in a Multi-RAT MS the same RF circuit is shared among various RATs (LTE, WCDMA, GSM) to perform receptions for various activities like, data reception, measurement, cell search etc. So, reserving the RF circuit continuously for GSM new cell identification for a duration 50.7 ms (worst case) is very time critical, as it effects the data throughput of the serving RAT, especially, when the MS is engaged in data transfer in another serving RAT, wherein the DRX inactivity period might be too short to allow for 50.7 ms of continuous activity on the GSM RAT.

(2) According to 3GPP TS 25.133 V11.1.0 (2012-06) section 8.4, there are two possibilities, when the MS is receiving High Speed Downlink Shared Channels (HS-DSCH) in CELL_FACH (CELL Forward access channel) state: (a) HS-DSCH discontinuous reception is not ongoing (b) HS-DSCH discontinuous reception (DRX) is ongoing. For the HS-DSCH DRX operation in CELL_FACH, the network node (base station or nodeB) indicates an inactivity time, a DRX cycle length and a RX burst length to the MS. In case of burst type of data transfer, once the data reception is over, the inactivity timer is set and upon expiry of inactivity timer, the HS-DSCH DRX operation in CELL_FACH state is initialized. The parameters to configure the MS in CELL_FACH state to discontinuously receive HS-DSCH for FDD mode is defined in 3GPP Technical Specification 3GPP TS 25.331 V11.1.0 (2012-03) section 10.3.6.36g. The parameter HS-DSCH DRX cycle$_{FACH}$ determines the length of the DRX Cycle during DRX operation, in frames and the shortest value which can be configured is 4 frames i.e. 40 ms duration. The parameter HS-DSCH Rx burstFACH determines the period within the DRX Cycle that the UE continuously receives HS-DSCH, in frames and the shortest value which can be configured is 2 frames i.e. 20 ms. For GSM measurements, when HS-DSCH (High-Speed Downlink Shared Channel) discontinuous reception (DRX) is on-going in the worst case the shortest DRX cycle length, can be 4 frames i.e. 40 ms, and the shortest HS-DSCH Rx burst FACH (Forward Access Channel): Rx_burst is 2 frames=20 ms, which provide a theoretical effective time gap=40−20=20 ms time gap. In practice, any implementation margins to retune the RF circuit to a different operating frequency and prepare for reception need to be deducted from the effective time gap. This short time gap (eg. 20 ms) is all that is available to be used for GSM measurement, as shown in FIG. 3 as "free gap". FIG. 3 illustrates free time gaps during ongoing reception, and also enhanced dedicated channel (E-DCH) allocation during ongoing reception. Using known techniques, in this short time gap, GSM cell searches/measurements (like RSSI and BSIC identification or BSIC identification in parallel with BSIC or RSSI re-confirmations) are not feasible. As specified above section the minimum continuous time duration required is 50 ms e.g. the RF circuit will be reserved for at least 50 ms for cell search.

Today, probably due to the above limitations, the requirements for GSM I-RAT cell reselection and measurement reporting in CELL_FACH state, when HS-DSCH discontinuous reception is ongoing is not specified in 3GPP TS 25.133 V11.1.0. It's specified only for LTE with WCDMA as connected RAT, but not GSM as connected RAT. Currently, the section-8.4a.2.5 "GSM measurements when HS-DSCH discontinuous reception is ongoing" is blank (not defined) and only specified as "Note: Further study is required for GSM measurements when DRX is active, especially regarding BSIC identification and reconfirmation".

However, "GSM measurements when HS-DSCH discontinuous reception is ongoing" is an important requirement for not only power saving purposes, but also to support proper I-RAT (GSM) mobility with regards to measurements and cell-reselection.

(B) Issues in MS self-initiated GSM cell search scenarios, when cell broadcast frequency list is not known to MS.

For example, in some scenarios, the wireless terminal receiver may also find that some of the frequencies in RSSI lists, even though having strong RSSI, are actually a traffic frequency instead of cell broadcast frequency. A wireless terminal searching for FCCH and SCH in those cells' signal will ultimately fail to decode them as it is a traffic frequency and FCCH and SCH are not transmitted on traffic frequencies. The wireless terminal will waste at least 88 slots, e.g. 50 ms time, per wrongly attempted frequency. This could happen quite often, when the wireless terminal searches the GSM cells in areas when there is no LTE or WCDMA/HSPA network coverage. In this scenario, when wireless terminal moves to an area with no LTE/WCDMA/HSPA network coverage and searches for a suitable GSM cell, the wireless terminal performs a frequency scan. The scanned frequencies could be a cell broadcast or traffic frequency. As this information is not known to the wireless terminal, every wrong frequency search attempt will lead to un-necessary waste of resources, time and MS battery power.

Apart from that, when the wireless terminal or MS is already camped or connected to any other RATs, like WCDMA/LTE, and the frequency error between the MS reception frequency and the base station (BTS) transmission frequency is small e.g. below 100 Hz, in such scenarios when the MS needs to perform GSM cell search without any prior knowledge of cell broadcast frequencies, it faces the similar problems as discussed above.

According to a first aspect, it is presented a method for Global System for Mobile communications, GSM, cell searches. The method is performed in a wireless terminal of a cellular network when the wireless terminal is active in a non-GSM radio access technology and comprises the steps of: scheduling reception of a part of a frame burst of a GSM frequency in the cellular network for the wireless terminal; and searching digital samples received on the GSM frequency for a predefined logical channel pattern. The predefined logical channel pattern indicates the repetition pattern of known data sequences over the GSM system defined time division multiple access (TDMA) frame structure in the received signal.

The method may further comprise the step of determining if the GSM frequency is a cell GSM broadcast frequency or if the GSM frequency is a cell GSM traffic frequency, wherein the GSM frequency is determined to be a cell GSM broadcast frequency when the predefined logical channel pattern is identified in the received digital samples and the GSM frequency is determined to be a cell GSM traffic frequency when no predefined logical channel pattern is identified in the received digital samples. Advantages of this method are: Less cell search time; identification of the presence of a neighbour GSM Cell and also to quickly know whether any GSM cell frequency is present as a neighbour cell or not.

The step of scheduling may comprise reception of at most 20 slots, preferably of at most 17 slots. Fast GSM cell search time may be provided with utilization of only 17 slots.

The method may further comprise the step of discontinuing the reception of a part of a frame burst of a GSM frequency when the GSM frequency is determined to be a cell GSM broadcast frequency or is determined to be a cell GSM traffic frequency. In this way RF circuit is continuously reserved only at a minimum of time.

The method may further comprise the steps of identifying a Synchronization Channel, SCH, for the GSM frequency when a predefined logical channel pattern thereof is identified; and scheduling reception only of a SCH and a Frequency Correction Channel, FCCH, for the GSM frequency for monitoring thereof. By identifying FCCH or SCH, monitoring of SCH is possible.

The method may further comprise the step of identifying a predefined logical channel pattern of a Frequency Correction Channel, FCCH, which may be performed by a FCCH search algorithm. The method may further comprise the step of identifying a predefined logical channel pattern of a Synchronization Channel, SCH, which may be performed by a SCH 64 bits unique SB TSC (training sequence) pattern search. The method may further comprise the step of identifying a predefined logical channel pattern of a pre-stored template.

When a pre-stored template is utilized, the step of identifying may comprise the steps of: modulating eight known Training Sequence Codes, TSC, by Gaussian filtered Minimum Shift Keying, GMSK; determining an angle for each complex I,Q pairs of the eight known TSC; determining difference in angle between each successive angle of the eight known TSC; selecting an angle difference template for each of the eight TSC, based on maximum correlation of difference in angle thereof; receiving digital samples; determining an angle for each complex I,Q pairs of received digital samples; determining difference in angle between each successive angle of the received digital samples; determining a maximum correlation between the difference in angle of the received digital samples and each of the angle difference templates; selecting a TSC based on the determining; and adjusting a slot start boundary according to an identified time-offset from a TSC start location.

The pre-stored template may comprise 28 bits I,Q modulated data of eight Training Sequence Codes, TSC, and two zero bits.

The step of identifying a predefined logical channel pattern of a pre-stored template may comprise the step of checking a repetition of the identified predefined logical channel pattern.

The step of identifying a predefined logical channel pattern may comprise identifying 42A, 42B, 42C multiple parameters in parallel, as shown in FIG. 4C. These parameters may include the start time and presence of FCCH, SCH, Normal Burst Training Sequences, burst boundary etc. In this embodiment a search is conducted in parallel of the presence of frequency correction burst (FB) data 42A and synchronisation burst (SB) data 42B and a pre-stored template data as derived from different known training sequence data patterns 42C. The search stops once any of these data patterns is detected and from that it is concluded whether the received input I,Q data is from a traffic- or a cell broadcast frequency. If any one of a synch burst (SB) or a frequency correction burst (FB) is detected or a predetermined logical channel pattern is identified from the TSC repeat pattern over the slots, then a broadcast channel is determined to have been found (Broadcast yes in FIG. 4C).

The method may further comprise the step of determining when to schedule reception of a desired logical channel e.g. FCCH, SCH etc. which the wireless terminal is required to decode. In this way a single RF circuit is made available for other utilization. The remaining time slots in the TDMA frame, i.e. slots that are not used for FCCH, SCH, e.g. slot #0 logical channel searching (only in cell broadcast frequency's slot#0 the FCCH, SCH channel appears), may be used for other carrier's RSSI measurement or BSIC reconfirmation etc., or may be used to measure another radio access technology. Alternatively, energy savings may be obtained by deactivating RF circuitry or baseband circuitry or both. Energy/power saving is one primary benefit of configuring the user equipment with DRX. Continuous tuning to a particular frequency is not required for BSIC identification. Instead the wireless terminal may use the available slots alternatively for GSM cell search, BSIC identification/reconfirmation and RSSI measurement on other frequencies, cell search or measurement of cells using other radio access technologies, or energy saving.

According to a second aspect, it is provided a wireless terminal for a cellular network, wherein the wireless terminal is arranged to perform Global System for Mobile communications, GSM, cell searches when the wireless terminal is active in a non-GSM radio access technology. The wireless terminal comprises: a processor circuit; and a computer program product storing instructions that, when executed by the processor circuit, causes the wireless terminal to: schedule reception of a part of a frame burst of a GSM frequency in the cellular network for the wireless terminal; and search digital samples received on the GSM frequency for a predefined logical channel pattern.

The instructions may comprise the further instruction to determine if the GSM frequency is a cell GSM broadcast frequency or if the GSM frequency is a cell GSM traffic frequency, wherein the GSM frequency is determined to be a cell GSM broadcast frequency when a predefined logical channel pattern is identified in the received digital samples and the GSM frequency is determined to be a cell GSM traffic frequency when no predefined logical channel pattern is identified in the received digital samples.

The instruction to schedule may comprise reception of at most 20 slots, preferably at most 17 slots.

The instructions may comprise a further instruction to discontinue the reception of a part of a frame burst of a GSM frequency when the GSM frequency is determined to be a cell GSM broadcast frequency or is determined to be a cell GSM traffic frequency.

The instructions may comprise further instructions to identify a Synchronization Channel, SCH, for the GSM frequency when a predefined logical channel pattern thereof is identified; and schedule reception only of a SCH and a Frequency Correction Channel, FCCH, for the GSM frequency for monitoring thereof.

The instructions may comprise a further instruction to identify a predefined logical channel pattern of a Frequency Correction Channel, FCCH, which may be performed by a FCCH search algorithm.

The instructions may comprise a further instruction to identify a predefined logical channel pattern of a Synchronization Channel, SCH, which may be performed by a SCH 64 bits unique SB TSC pattern search.

The instructions may comprise a further instruction to identify a predefined logical channel pattern of a pre-stored template, which may comprise the instructions to: modulate eight known Training Sequence Codes, TSC, by Gaussian filtered Minimum Shift Keying, GMSK; determine an angle for each complex I,Q pairs of the eight known TSC; determine difference in angle between each successive angle of the eight known TSC; select an angle difference template for each of the eight TSC, based on maximum correlation of difference in angle thereof; receive digital samples; determine an angle for each complex I,Q pairs of received digital samples; determine difference in angle between each successive angle of the received digital samples; determine a maximum correlation between the difference in angle of the received digital samples and each of the angle difference templates; select a TSC based on the determine; and adjust a slot start boundary according to an identified time-offset from the TSC start location.

The pre-stored template may comprise 28 bits I,Q modulated data of eight Training Sequence Codes, TSC, and two zero bits.

The instruction to identify a predefined logical channel pattern of a pre-stored template may comprise the step of checking a repetition of the identified predefined logical channel pattern.

The instruction to identify a predefined logical channel pattern may comprise identifying multiple parameters in parallel.

The instruction may comprise the further instruction to determine when to schedule reception of a desired logical channel which the wireless terminal is required to decode.

According to a third aspect, it is presented a computer program for Global System for Mobile communications, GSM, cell searches in a wireless terminal of a cellular network when the wireless terminal is active in a non-GSM radio access technology. The computer program comprises computer program code which, when run on a wireless terminal, causes the wireless terminal to: schedule reception of a part of a frame burst of a GSM frequency in the cellular network for the wireless terminal; and search digital samples received on the GSM frequency for a predefined logical channel pattern. According to a fourth aspect, it is presented a computer program product comprising a computer program according to the third aspect and a computer readable medium on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The solutions are now described, by way of example, with reference to the accompanying drawings, in which.

DETAILED DESCRIPTION

The solutions will now be described more fully hereinafter with reference to the accompanying drawings, in which certain embodiments are shown. These solutions may, however, be embodied in many different forms and should not be construed as limited to the embodiments set forth herein; rather, these embodiments are provided by way of example so that this disclosure will be thorough and complete, and will fully convey the scope of the solutions to those skilled in the art. Like numbers refer to like elements throughout the description.

Figure 1:
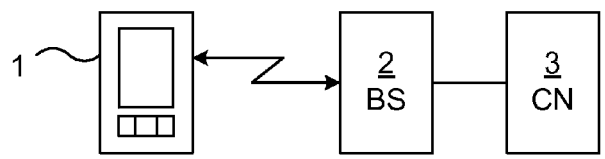
FIG. 1 is a schematic diagram illustrating an environment where embodiments presented herein can be applied.

FIG. 1 is a schematic diagram illustrating a wireless terminal 1 in a cellular network comprising a base station 2 and a core network 3. The wireless terminal 1 may be a multi-RAT mobile station or user equipment, possible to be utilized in GSM (Global System for Mobile communications) and one or more of e.g. WCDMA (Wideband Code Division Multiple Access), LTE (Long Term Evolution), and TDSCDMA (Time Division Synchronous Code Division Multiple Access).

Figure 2:
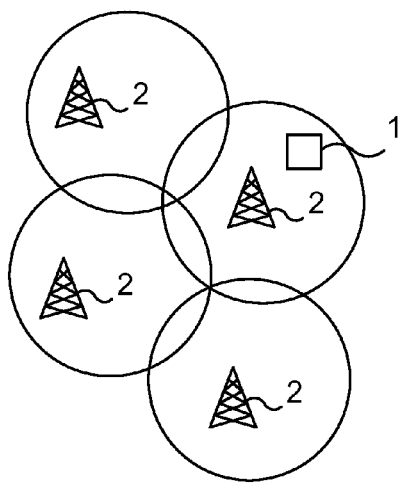
FIG. 2 is a schematic diagram illustrating a wireless terminal in a cellular network.
Figure 3:
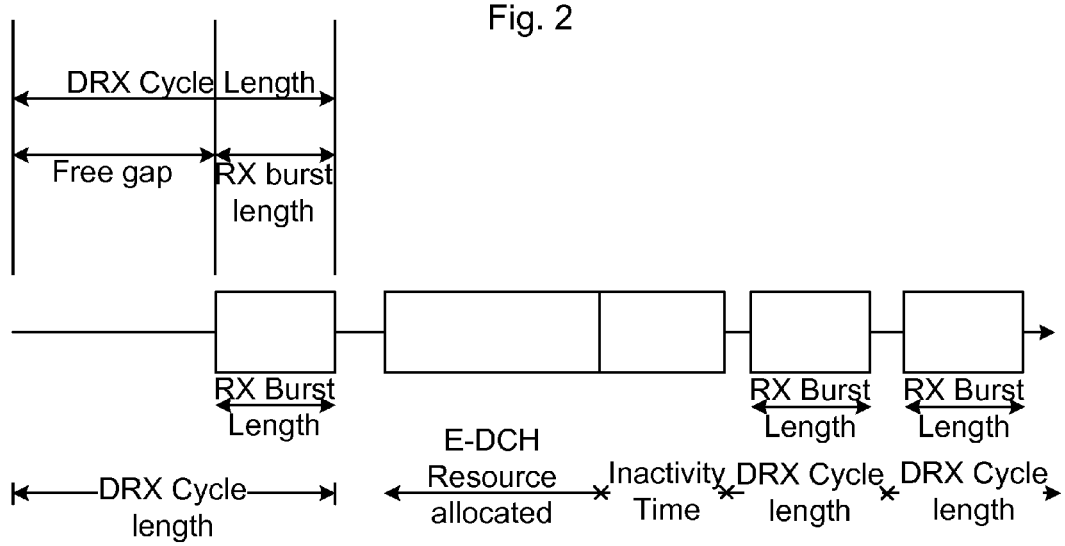
FIG. 3 is a schematic diagram illustrating DRX cycle length.

FIG. 2 is a schematic diagram illustrating the wireless terminal 1 in a cell having multiple neighbouring cells. The wireless terminal 1 may thus be active in a non-GSM radio access technology of the present cell it is camped on, and by RSSI measurements identify GSM cells, either in the same present cell or in neighbouring cells. By an active wireless terminal is meant a wireless terminal being camped on or connected to or having a serving cell in a cell.

The wireless terminal measures the RSSI of different frequency carriers across the frequency bands and sorts them based on the measured RSSI value. Then in order of descending RSSI, the wireless terminal typically tunes to each carrier frequency in the measured cell list, and RSSI list, to receive digital samples therefrom.

The wireless terminal 1 is arranged to perform GSM cell searches when the wireless terminal is active in a non-GSM radio access technology. As illustrated in FIG. 5, the wireless terminal comprises a processor circuit 30 and a computer program product 64 storing instructions that, when executed by the processor circuit 30, causes the wireless terminal 1 to perform the steps as illustrated in the flow diagrams of FIG. 4A-4E. Hence, to cause the wireless terminal to: schedule 40 reception of a part of a frame burst of a GSM frequency in the cellular network for the wireless terminal 1 and search 41 digital samples received on the GSM frequency for a predefined logical channel pattern. The instructions may further cause the wireless terminal to determine 42 if the GSM frequency is a cell GSM broadcast frequency or if the GSM frequency is a cell GSM traffic frequency, wherein the GSM frequency is determined to be a cell GSM broadcast frequency when a predefined logical channel pattern is identified in the received digital samples and the GSM frequency is determined to be a cell GSM traffic frequency when no predefined logical channel pattern is identified in the received digital samples.

A frame burst may e.g. be a Frequency correction burst (FB), a synchronization burst (SB) or a multi-frame burst.

The instruction to schedule 40 may comprise reception of at most 20 slots, or of at most 17 slots. Over two TDMA frames, or over 17 slots, the presence of a predefined logical channel pattern SF-TSC-SF (Stealing flag-TSC-stealing flag) is possible. RF delay may require perhaps 1, 2 or 3 slots to be able to receive the predefined logical channel pattern, requiring up to at most 20 slots for reliable reception.

A receiver of the wireless terminal may by reading only 17 slots digital samples, e.g. I,Q data, to find out the presence of a predefined logical channel pattern which indicates the repetition pattern of known data sequences over the GSM system defined time division multiple access (TDMA) frame structure in the received signal. Such a pattern may be a Training Sequence Code (TSC) pattern, SF-TSC#-SF, having a length of 1+26+1=28 bits, see FIG. 4F. There are 8 possible patterns, and the wireless terminal may further find out how that pattern repeats in every alternate slots, e.g. in module 2 slot numbers, e.g. 0, 2, 4, 6, 8, 10, . . . or at every 8th slot 0, 8, . . . number. This indicates whether the 51-multiframe, slot#0, will appear in even numbered slots or odd numbered slots according to the receiver's reading slot reference. Also, if it is a broadcast frequency channel then the same 28 bit sequence number will repeat mandatorily at 0, 8, . . . slots and might also appear at 2, 4, 6, . . . , e.g. on every alternate slots as well. That helps to infer that the tuned frequency channel is a cell broadcast channel, as in cell broadcast channel frequency in slot#0 the 51 signalling channel structure is transmitted. A legacy method is dependent only on the finding of FCCH and SCH detection, which takes longer time, as their transmission rate over a 51 multi-frame structure is of lower rate. However, the method proposed herein helps to quickly detect this within a normal burst also, e.g. which is there in CCCH, BCCH, etc., by detecting the presence of specific or predefined logical channel pattern and its repetition. There is thus need not to wait until FCCH/SCH is received.

The instructions may comprise a further instruction to discontinue 43, 44 the reception of a part of a frame burst of a GSM frequency when the GSM frequency is determined to be a cell GSM broadcast frequency or is determined to be a cell GSM traffic frequency.

If DTX (Discontinuous transmission) is detected, or if no TSC is detected, out of 17 slots collected digital samples, I,Q samples, this indicates the tuned channel is a traffic channel or non-broadcast frequency channel. In GSM DTX is only possible in the traffic frequency channels, e.g. for some slots of traffic channels nothing is transmitted if there is a DTX.

By identifying the channel type as a broadcast channel type, the search shall continue on that frequency. By identifying the channel type as a traffic frequency the search process may be aborted and go to next frequency search.

There is thus no need to use RF continuously for BSIC identification, as in legacy methods. Rather, slotted mode measurement is possible with this method. That also allows using short time gaps instead of longer times, as provided from other RAT, for GSM measurement completion. For example, short gap in WCDMA enhanced DRX scenario. HSDPA in Cell FACH and DRX operation is ON and GSM IRAT measurements are requested. The worst case time gap during this scenario is 2 frames, about 20 ms.

The instructions may comprise further instructions to: identify 45 a Synchronization Channel, SCH, for the GSM frequency when a predefined logical channel pattern thereof is identified; and schedule 46 reception only of a SCH and a Frequency Correction Channel, FCCH, for the GSM frequency for monitoring thereof.

The instructions may comprise a further instruction to identify a predefined logical channel pattern of a Frequency Correction Channel, FCCH, which may be by a FCCH search algorithm implemented in mobile stations of today. If FCCH is found, which contains 148 zeros transmitted bits, then the wireless terminal knows that it is a cell broadcast frequency and also identifies the slot#0 position, e.g. 51-multi-frame structure. Other logical channel's pattern over the TDMA frames is further evident from this information. Then wireless terminal may thus schedule the SCH reception after one TDMA frame.

The instructions comprise a further instruction to identify a predefined logical channel pattern of a Synchronization Channel, SCH, which may be performed by a SCH 64 bits unique SB TSC pattern search. If SCH, 64 bits unique SB TSC, is detected, then the wireless terminal determines that it is a cell broadcast frequency and also identifies the slot#0 position, e.g. 51-multi-frame structure. Other logical channel's appearance patterns over the TDMA frames are further evident from this information. The wireless terminal may directly receive the SCH, skipping FCCH, and do the frequency and time correction and then BSIC decoding and TDMA frame detection after reading SB.

If during the part of the frequency burst continuous reception, FCCH or SCH is found in any slot, then the reception may be terminated immediately after that slot's reception. After deriving a cell broadcast frequency and the slot number, where the 51-multi-frame structure will appear, e.g. slot#0, sufficient information is obtained.

The instructions may comprise a further instruction to identify a predefined logical channel pattern of a pre-stored template. The instruction to identify a logical channel may comprise the instructions to perform the method as illustrated in the flow diagram of FIG. 7, hence to:

- modulate 50 eight known Training Sequence Codes, TSC, by Gaussian filtered Minimum Shift Keying, GMSK;
- determine 51 an angle for each complex I,Q pairs of the eight known TSC;
- determine 52 difference in angle between each successive angle of the eight known TSC;
- select 53 an angle difference template for each of the eight TSC, based on maximum correlation of difference in angle thereof;
- receive 54 digital samples;
- determine 55 an angle for each complex I,Q pairs of received digital samples;
- determine 56 difference in angle between each successive angle of the received digital samples;

determine 57 a maximum correlation between the difference in angle of the received digital samples and each of the angle difference templates;

select 58 a TSC based on the determine 57; and adjust 59 a slot start boundary according to an identified time-offset from the TSC start location.

The pre-stored template may comprises 28 bits I,Q modulated data of eight Training Sequence Codes, TSC, and two zero bits.

The instruction to identify a predefined logical channel pattern of a pre-stored template may comprise the step of checking a repetition of the identified predefined logical channel pattern.

As the cell/BCC will not change as long as the same frequency is received, the TSC, with Stealing Flags, pattern number will also not change from one CCCH/BCCH NB to another for the same cell. The pre-stored template will repeat mandatorily at least at every 8 slots in normal cell configuration, where the CCCH/BCCH repeats in slot#0. This means that this pattern will be found at a first slot then after 8 slots and repeats after every 8 slots over the TDMA frames. For other cell configurations, it might repeat at 2, 4, or 6 slots as well. It might thus appear either in slot 2 or 4 or 6 or 0, 2, 4, 6 i.e. any alternate slot pattern, only in even slots or odd slots.

The wireless terminal has thus to first detect the TSC sequence number present in the received slot digital data, e.g. I,Q data. Further, the slot boundary may be detected accordingly by the TSC number in next received slot I,Q data and continue like that for next 17 received slots maximum.

The wireless terminal may correlate the pre-stored 28 bits (16 sequences) I,Q modulated data with the received data. Once a match sequence is found, the wireless terminal will derive the slot boundary, as TSC is placed from 61th location in the burst, slot time boundary is known now. Then the wireless terminal may check how that pattern is repeated. If the pattern is present every alternate slot (0, 2, 4, 6) or if it is present after 8 slots (slot 0 in TDMA frame-1, slot 0 in TDMA frame-2, etc.), this indicates that it is a broadcast frequency, wherein BCCH/CCCH channels are getting transmitted in slot number 0, of the broadcast frequency. Once that is detected, the wireless terminal may terminate the reception.

Figure 4A:
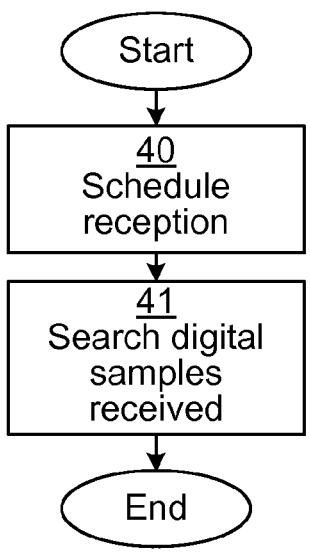
FIGS. 4A-4E are flow charts illustrating methods for embodiments presented herein.
Figure 4B:
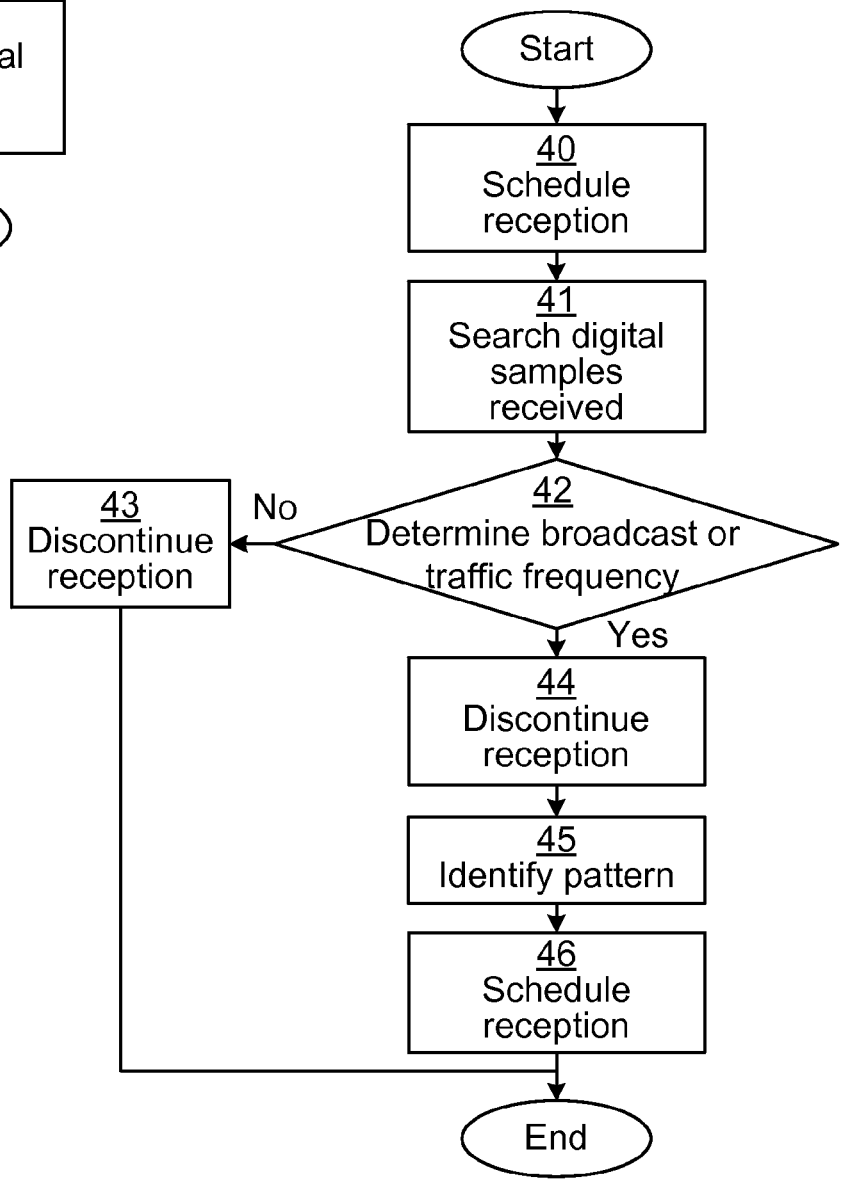
Figure 4C:
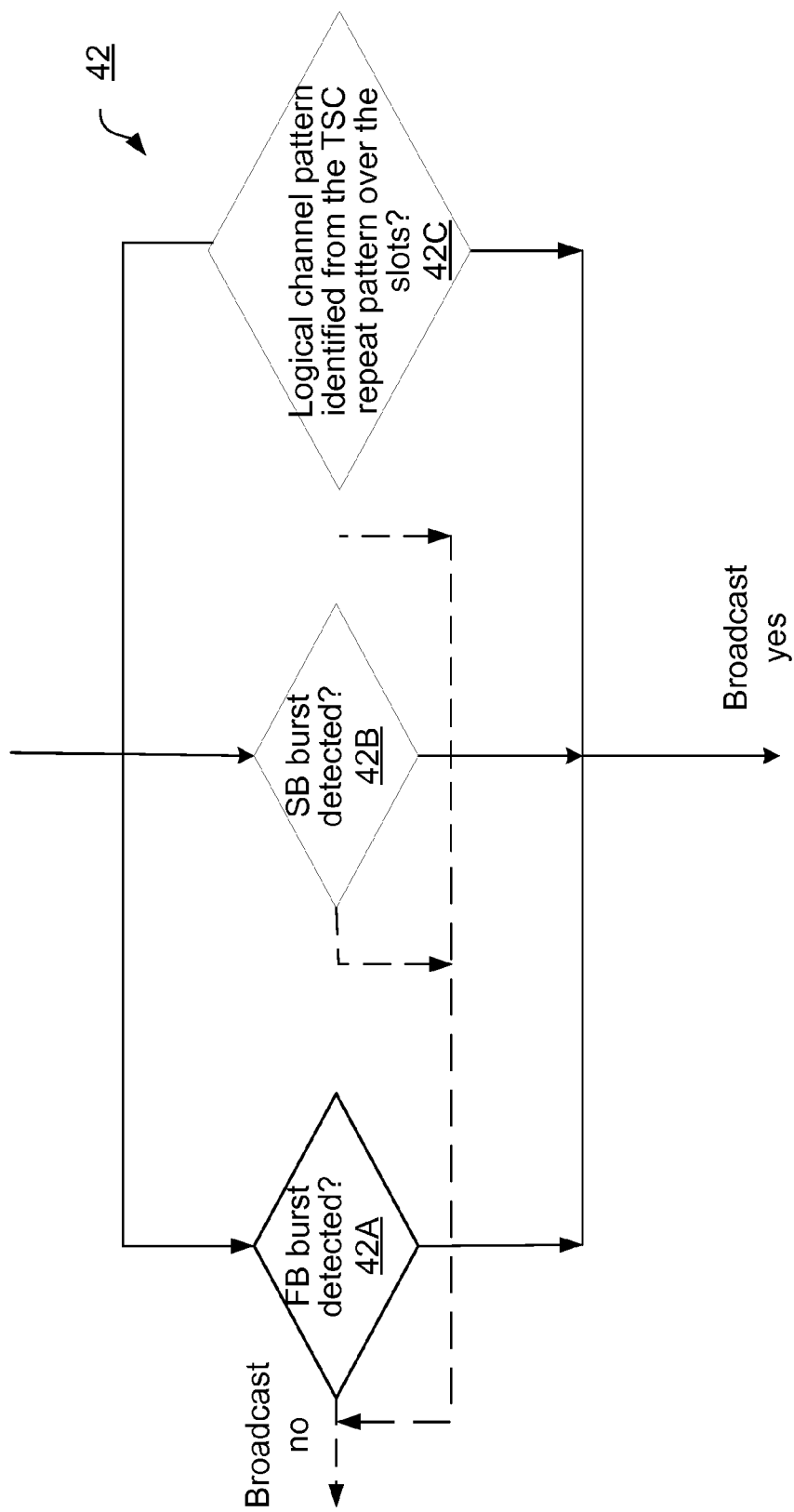
Figure 5:
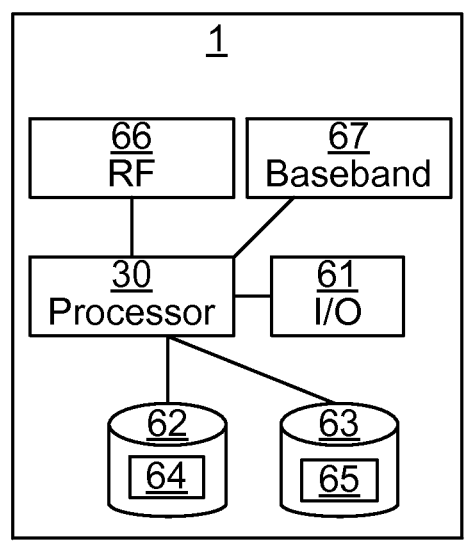
FIG. 5 is a schematic diagram illustrating some components of a wireless terminal.

The instruction to identify a predefined logical channel pattern may comprise instruction to identify according to multiple parameters in parallel, FCCH (FB burst 42A), SCH (SB burst 42B) and pre-stored template 42C, illustrated in FIG. 4C as an example embodiment of step 42 illustrated in FIG. 4B. In this embodiment a search is conducted in parallel of the presence of frequency correction burst (FB) data 42A and synchronisation burst (SB) data 42B and a pre-stored template data as derived from different known training sequence data patterns 42C. The search stops once any of these data patterns is detected and from that it is concluded whether the received input I,Q data is from a traffic- or a cell broadcast frequency. If any one of a synch burst (SB) or a frequency correction burst (FB) is detected or a predetermined logical channel pattern is identified from the TSC repeat pattern over the slots, then a broadcast channel is determined to have been found (Broadcast yes in FIG. 4C).

When a wireless terminal receives downlink GSM signals, it can receive either traffic channel frequency or broadcast channel frequency. If it receives a traffic channel frequency then only traffic channels (TCH) will be transmitted using that frequency. If it receives a broadcast channel frequency then it will be as shown in Table-1 (reference-book—"Mobile handset design" Sajal Kumar Das, WILEY publication, 2010, Version 1, chapter 7, section 7.8).

TABLE 1

Channel structure in cell broadcast frequency

| Possible time slots of BCCH carrier frequency | Downlink channels |
| --- | --- |
| 1-7 | 1 TCH/F + SACH |
| 1-7 | 2 TCH/F + SACH |
| 1-7 | 8 TCH/F + SACH |
| 0 (broadcast frequency) (non-combined configuration) | 1 SCH + 1 FCCH + 1 BCCH + 1 AGCH + 1 PCH |
| 0 (broadcast frequency) (combined channel configuration) | 1 SCH + 1 FCCH + 1 BCCH + 1 reduced rate AGCH + 1 reduced rate PCH + 4 SDCCH + SACCH |
| 2, 4, 6 (broadcast frequency) | 1 BCCH + 1 AGCH + 1 PCH |

The FCCH, SCH will thus appear only in slot #0 of BCCH frequency and CCCH appears in slot#0 and/or #2 and/or #4 or #6.

FCCH uses Frequency correction Burst (FB), SCH uses sync burst (SB), and other channels including CCCH in downlink uses Normal burst (NB). FCCH burst has 148 bits of all zero sequence, so is readily identified. SCH burst has 64 bits unique training sequence and this also is readily identified. NB has 26 bits of 8 types of TSCs. Out of the 8 TSC, one TSC is used in a cell, which is directly mapped to the its BCC (cell identity) number.

According to 3GPP TS 45.002 V10.3.0 (2012-03), section 5.2.3, "For BCCH and CCCH", the TSC must be equal to the BCC, as defined in 3GPP TS 23.003. In networks supporting E-OTD (Enhanced-Observed Time Difference) Location services, see 3GPP TS 43.059, the TSC shall be equal to the BCC for all normal bursts on BCCH frequencies."

Figure 4D:
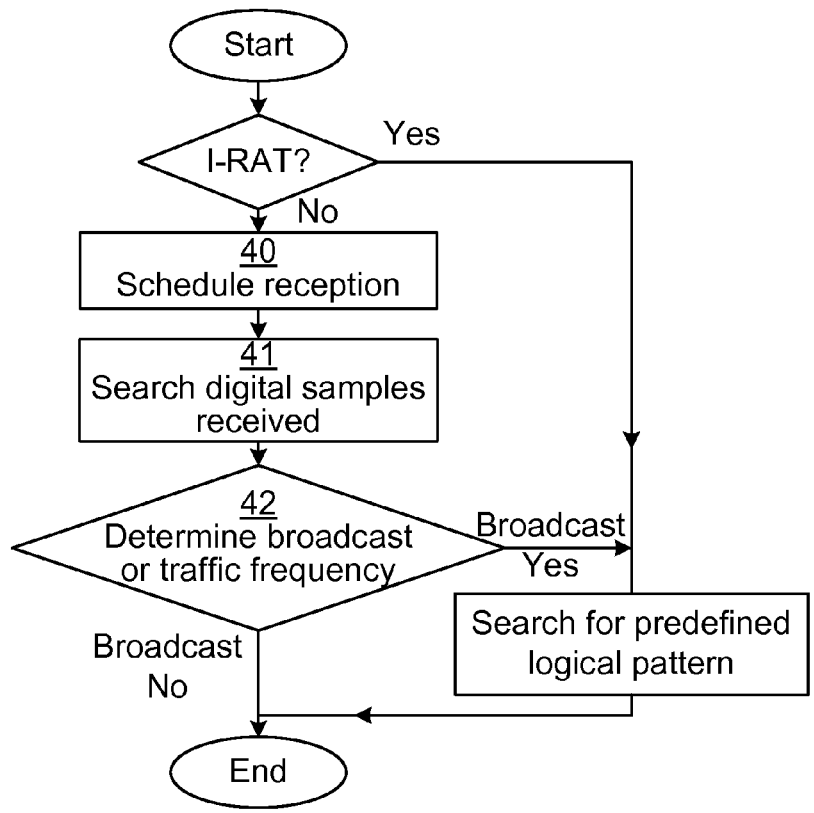
Figure 4E:
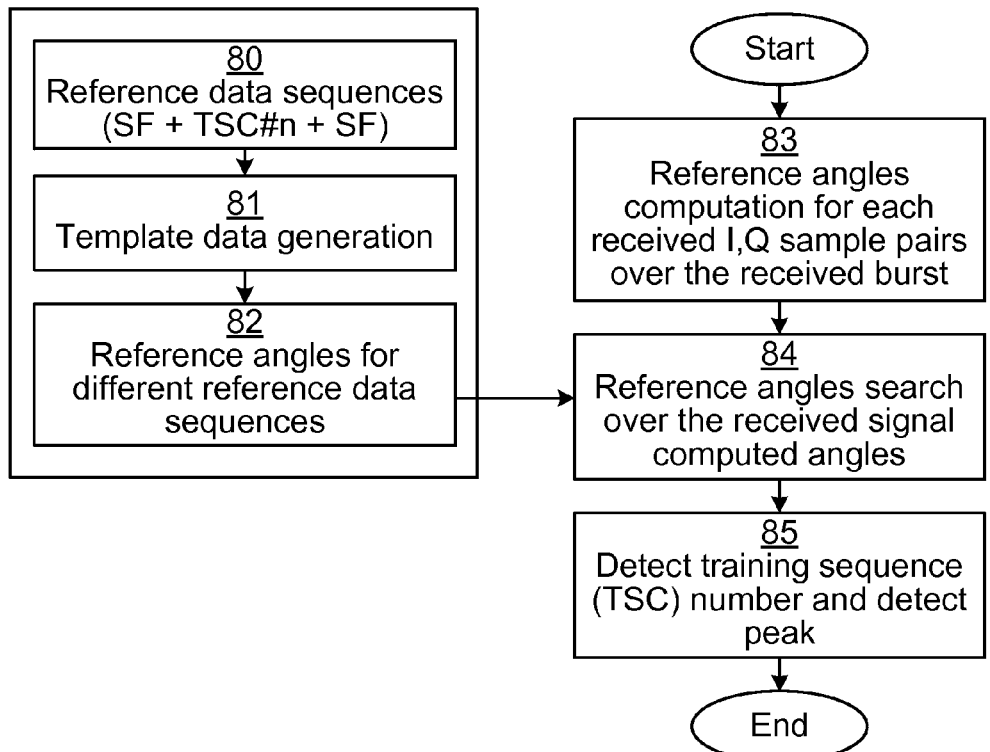
Figure 4F:
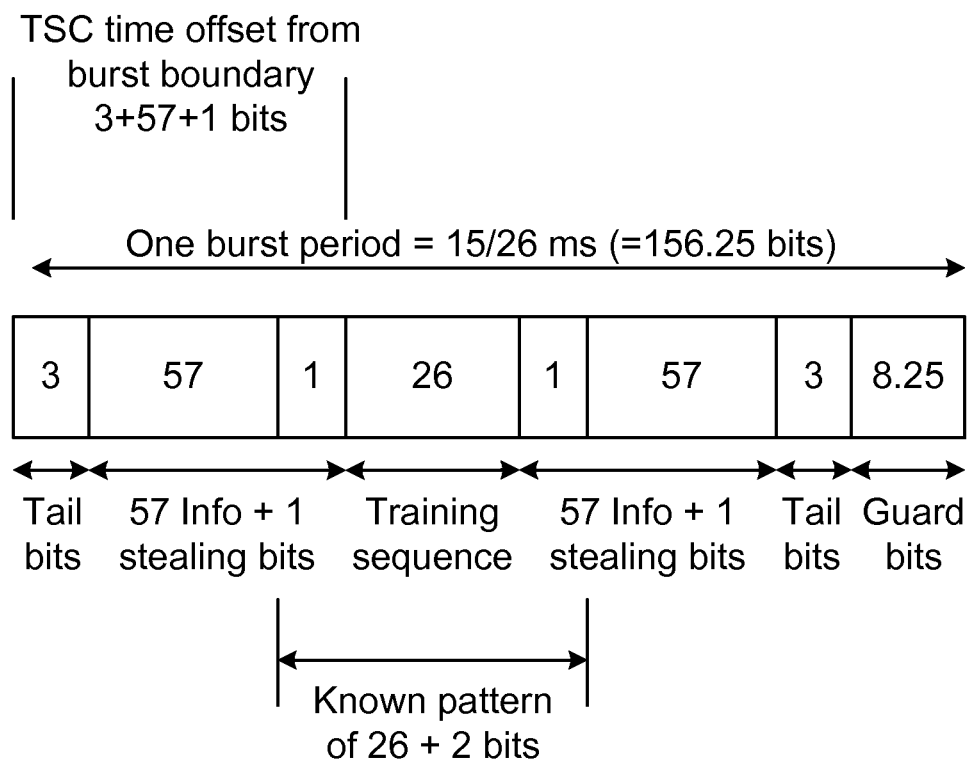
FIG. 4F is a schematic diagram illustrating a GSM burst.

The NB, see FIG. 4F, contains two stealing flags (SF) on both sides of the 26 bits training sequence which are used to indicate whether even bits or odd bits or both are been stolen or occupied by FACCH or not from speech e.g. TCH channel information bits. In the case of a packet switched channel, these bits are used to indicate the coding scheme used. But in case of SACCH, BCCH, CCCH, this stealing flag is a dummy and not used according to current specifications, see 3GPP TS 45.003 V9.0.0 (2009-12): section-2.1. These two flags are specified to be set to '1' in the transmitter side and are unused in the receiver side.

The below information can be derived according to embodiments herein:

(1) For FCCH 148 bits of all zero sequence is derived.

(2) For SCH a sequence of 64 bits fixed TSC sequence is derived.

(3) For BCCH, CCCH one 26 bit TSC pattern out of eight possible ones, according to cell BCC number, and 2 fixed SFs (unchanged over repetition) is derived. As BCCH/CCCH can appear only in slot 0, 2, 4, 6 in cell broadcast frequency, total 26+2=28 bits is found, fixed bit pattern, could repeat alternatively e.g. at slot#0, 2, 4, 6 in a TDMA frames and keep on repeating over modulo-2 slots. This pattern can appear only in modulo-2 slot numbers, not in other slots. As the stealing flags are dummies, and can be 0 or 1, a 28 bits known sequence is formed, taking these dummy bits as 1-1 or 0-0. That means the fixed 28 sequence will be 0-TSC#N–0 or 1-TSC#N–1. Where TSC#N is any of the TSC in set defined in 3GPP TS 45.002 sec 5.2.3. Also, as discussed above, for any cell the cell broadcast frequency and the TSC# are linked/mapped. For various cells, with different BCC number, the TSC number will vary, but for a particular cell the TSC transmitted in NB of CCCH/BCCH/SACCH will be the same in the cell broadcast frequency.

There could be total 2*8=16 possible sequences, (both the unused SFs in BCCH or CCCH NB will have same values either 0,0 or 1,1) each of length 28 bits. To simplify and make the process faster, these predefined 28 bits SF-TSC#-SF known 16 data patterns could be GSMK modulated and pre-stored as template data a priori for CCCH or BCCH channel identification, this is indicated here as Pre-store-Template_data.

The wireless terminal will first determine the presence of TSC sequence numbers in the received I,Q data. Then it will determine the way in which the TSC numbers are repeating over the TDMA frames. From that the information about whether it is a cell broadcast frequency or not and which are the alternate (modulo 2) slots where FCCH/SCH might appear e.g. slot#0 possibly will lie in even number of slots or odd number of slots, are derived.

The instruction comprises the further instruction to determine when to schedule reception of a desired logical channel which the wireless terminal is required to decode, which may be SCH.

The wireless terminal may schedule for SCH, or FCCH and SCH, reception only in identified slots. In the other slots, the wireless terminal may program/schedule the RF for RSSI measurement of other carriers or may do BSIC reconfirmation.

For BSIC reconfirmation, the wireless terminal may use two approaches. As the cell timing is now known, the wireless terminal may check whether the SCH of that cell is aligned with the free alternate slot here. If it is, then the wireless terminal may program the BSIC reconfirmation through SCH. If it is not aligned with the free slots, the wireless terminal may use the normal burst reading and finding the TSC number and then mapping the TSC number to BCC number and then confirm the cell through BCC match.

This technique will make the measurement very fast as for BSIC identification, since now the wireless terminal need not have to continuously use the RF circuitry for GSM cell identification. Rather, the RF circuitry may be shared alternatively in different time slots, knowing the presence of FCCH/SCH in even or odd slot as mentioned above, for doing all the related tasks like, RSSI measurement, BSIC identification and re-confirmation.

A method may be used to determine the presence of the predefined logical channel pattern, the TSC sequence in received I,Q data, identifying the TSC sequence number in any received normal burst and hence the time slot boundary. The predefined logical channel pattern indicates the repetition pattern of known data sequences over the TDMA frame structure. Once the time slot boundary is detected then that helps the wireless terminal to adjust the further reception time window and TSC search time window accordingly. That helps to synchronize and to reduce the training sequence search length over the unknown time structure.

An example method is depicted below for searching different expected data patterns in the received signal (see FIG. 4E).

(1) Template Search Data Generation:

For searching the expected patterns in the received signal, the template data patterns are derived and pre-stored using the following steps illustrated in FIG. 4E.

(1.a) Pre-Known Data Sequence Derivation for 8 TSCs:

In the CCCH/BCCH normal burst (see FIG. 4F), there are 3 bits tail bits, 57 bits info bits, 1 bit left SF, 26 bits TSC, 1 bit right SF, 57 bits info bits, 3 bits tail bits and 8.25 bits guard bits are present. There are 8 TSCs defined 80 in 3GPP TS 45.002 V10.3.0 (2012-03)(section 5.2.3) as below:

| TSC | Training sequence bits (BN61, BN62, . . . BN86) |
|---|---|
| 0 | (0, 0, 1, 0, 0, 1, 0, 1, 1, 1, 0, 0, 0, 0, 1, 0, 0, 0, 1, 0, 0, 1, 0, 1, 1, 1) |
| 1 | (0, 0, 1, 0, 1, 1, 0, 1, 1, 1, 0, 1, 1, 1, 1, 0, 0, 0, 1, 0, 1, 1, 0, 1, 1, 1) |
| 2 | (0, 1, 0, 0, 0, 0, 1, 1, 1, 0, 1, 1, 1, 0, 1, 0, 0, 1, 0, 0, 0, 0, 1, 1, 1, 0) |
| 3 | (0, 1, 0, 0, 0, 1, 1, 1, 1, 0, 1, 1, 0, 1, 0, 0, 0, 1, 0, 0, 0, 1, 1, 1, 1, 0) |
| 4 | (0, 0, 0, 1, 1, 0, 1, 0, 1, 1, 1, 0, 0, 1, 0, 0, 0, 0, 0, 0, 1, 1, 0, 1, 0, 1, 1) |
| 5 | (0, 1, 0, 0, 1, 1, 1, 0, 1, 0, 1, 1, 0, 0, 0, 0, 0, 0, 1, 0, 0, 1, 1, 1, 0, 1, 0) |
| 6 | (1, 0, 1, 0, 0, 1, 1, 1, 1, 1, 0, 1, 1, 0, 0, 0, 1, 0, 1, 0, 0, 1, 1, 1, 1) |
| 7 | (1, 1, 1, 0, 1, 1, 1, 1, 0, 0, 0, 1, 0, 0, 1, 0, 1, 1, 1, 0, 1, 1, 1, 1, 0, 0) |

As discussed earlier, for template data generation 81 purpose, the stealing flags are set to 1,1. Practically, the values of SF may be set/trained knowing the SF values used in earlier received CCCH/BCCH normal bursts from the same network. The tails bits are also known to the MS and here these are set to 0. The information bits (57 info bits on the left and 57 info bits in the right of the SF-TSC-SF sequence) in the normal burst are kept as random bits.

Then the burst data is GMSK modulated.

(1.b) Computation of Reference Angles for these 28 Bits Pre-Known Data Sequences:

As defined in 3GPP TS 45.004 V8.0.0 (2008-12) section 2, after the GMSK modulation, as defined in specification, the modulated waveform can be expressed as below:

$$x(t') = \sqrt{\frac{2E_c}{T}} \cdot \cos(2\pi f_0 t' + \varphi(t') + \varphi_0) = A \cdot \cos(2\pi f_0 t' + \varphi(t') + \varphi_0) \quad (1)$$

where $E_c$ is the energy per modulating bit, $f_o$ is the center frequency and $\phi_o$ is a random phase and is constant during one burst. In GMSK, the amplitude $$\sqrt{\frac{2E_c}{T}}$$

e.g. A is kept constant and the bits of the digital modulation data are used to increase or decrease the phase by a fixed angle. The rate of the change of the phase is limited by the means of a Gaussian low-pass filter. In theory, each bit influences the phase at any time in the past and in the future. However, this effect is small a few bits in the past. A few bits later the phase gets increased or decreased by a nearly constant angle. It means, in a long period the bits have a cumulative effect on the phase, and the influence of each bit is steady outside a short transient time interval. Theoretically, it is noticed that the change of angle based on the next input data bit as '1' or '0' is constant. Ideally, if past four bit sequences are already known, or already decoded, then the next bit can be estimated by comparing the possible angle difference values. From the generated I,Q samples, with known 28 bits SF+TSC+SF data sequence, the Angle computation module computes the angle for each complex (I,Q) sample pairs. This just computes the angle Φ[n] for each generated complex sample pairs.

$$\Phi[n]=\tan^{-1}(Q[n]/I[n]).$$

Where n is 0, 1, . . . , 156.

Next, the angle difference between two successive complex (I,Q) pairs, e.g. Rx_Angle_Diff [n]=Φn+1−Φn=$\tan^{-1}$ (Q(n+1)/I(n+1))−$\tan^{-1}$ (Q(n)/I(n)), are computed and stored in an array, called Diff_Angle_Array[n]. As the angle jump between two constellations (I,Q pairs) is determined, it eliminates the φ₀ part in the above equation (1). The length of the array will be (N−1), here in case of GSM, N=156. Out of all these difference angles, only the part which is generated due to known SF+TSC+SF data, is taken out, which e.g. is Diff_Angle_TSC[n]. This will be 28 angles, out of that first few, e.g. 5, difference angles are not taken as these are influenced by the random unknown data, GMSK property.

In this way, the angle differences Diff_Angle_TSC′′′[n]82, which is shown as Ref_Angle_TSC_n[ ] below, for different TSC sequences, are predetermined (m=0, . . . , 7 and n=0, . . . 20 angle differences between two successive complex (I,Q) pairs are taken here out of 28 angles) and stored locally in the memory of the wireless terminal as pre-stored template data. The same may be derived from the actual received data when the wireless terminal receives from the BTS using different TSC numbers, or this may also be derived empirically using standard GMSK modulation theory. Now, in the total 28 known sequences, the first 4 sequences are not taken as these will be influenced by the random data bits. Only 20 inner angles in the array (the first few angles and the last few angles in the set are not used) are thus used in the template.

For example, here are the computed reference angle difference data for 8 different TSCs given below, only middle 20 set of reference angle diff values are chosen here:

Reference angles for TSC#0 sequence=Ref_Angle_TSC_0[ ]={2.12089, −1.026206, 0.478647, −1.028741, −1.562757, 2.118355, −2.12089, 1.026206, −0.478647, 1.028741, 1.562757, −2.118355, 2.12089, −1.020702, 1.020702, −2.12089, 2.12089, −1.026206, 0.478647, −1.028741, −1.562757};

Reference angles for TSC#1 sequence=Ref_Angle_TSC_1[ ]={2.115387, −1.562757, −1.028741, 0.478647, −1.023238, 2.12089, −2.12089, 1.020702, −1.020702, 2.12089, −2.115387, 1.562757, 1.028741, −0.478647, 1.023238, −2.12089, 2.115387, −1.562757, −1.028741, 0.478647, −1.023238};

Reference angles for TSC#2 sequence=Ref_Angle_TSC_2[ ]={−1.020702, 1.026206, 1.562757, −2.112852, −0.478647, 1.023238, 1.020702, −1.020702, −1.026206, 0.478647, 2.112852, −1.562757, −1.023238, 1.020702, 1.020702, −1.020702, −1.020702, 1.020702, 1.026206, −0.478647, −2.112852};

Reference angles for TSC#3 sequence=Ref_Angle_TSC_3[ ]={−1.020702, 1.020702, 1.026206, −0.478647, −2.112852, 1.562757, 1.023238, −1.020702, −1.026206, 0.478647, 2.112852, −1.562757, −1.023238, 1.020702, 1.020702, −1.020702, −1.020702, 1.020702, 1.026206, −0.478647, −2.112852};

Reference angles for TSC#4 sequence=Ref_Angle_TSC_4[ ]={1.028741, −0.484151, 0.481183, −1.028741, 1.573332, −1.565293, −1.023238, 1.020702, 1.026206, −0.484151, 0.481183, −1.023238, −1.020702, 1.026206, −1.573332, 1.565293, 1.028741, −0.484151, 0.481183, −1.028741, 1.573332};

Reference angles for TSC#5 sequence=Ref_Angle_TSC_5[ ]={−1.026206, 0.484151, −0.481183, 1.023238, 1.020702, −1.026206, 1.573332, −1.565293, −1.028741, 0.484151, −0.481183, 1.028741, −1.573332, 1.565293, 1.023238, −1.020702, −1.026206, 0.484151, −0.481183, 1.023238, 1.020702};

Reference angles for TSC#6 sequence=Ref_Angle_TSC_6[ ]={−1.565293, 2.112852, 0.484151, −0.481184, −2.112852, 1.568261, 1.565293, −2.118355, 2.12089, −1.026204, 0.484151, −0.481183, −2.118355, 1.020702, 2.115387, −1.568261, −1.565293, 2.112852, 0.484151, −0.481184, −2.112852};

Reference angles for TSC#7 sequence=Ref_Angle_TSC_7[ ]={1.020702, −1.020702, −1.020702, 1.026206, 1.562757, −2.112852, −0.478647, 1.023238, 1.020702, −1.020702, −1.026206, 0.478647, 2.112852, −1.562757, −1.023238, 1.020702, 1.020702, −1.020702, −1.020702, 1.026206, 1.562757};

Now, these template reference angles will be used for searching the TSC data patterns in the received input signal.

(2) Template Data Sequence Search in the Received Signal:

(2.a) Computation of Angles from the Received Input Signal:

The receiver receives the RF signal, and then down converts the RF signal to baseband signal. An analogue-to-digital converter samples the converted baseband signal to digital signal and gives digital (I,Q) samples as output. For every received Normal burst (NB), there will be around 156 complex (I,Q) sample pairs in GSM. N=156.

I,Q pair Angle Computation: The complex (I,Q) sample pairs are used and the angle for each complex (I,Q) sample pairs is computed. This computes the angle Φ[n] for each complex sample pairs. $\Phi[n]=\tan^{-1}(Q[n]/I[n])$. Where n is 0, 1, . . . , 156.

Angle Difference Computation 83: Next, the angle difference between two successive complex (I,Q) pairs (e.g. Rx_Angle_Diff [n]=φn+1−φn=$\tan^{-1}$ (Q(n+1)/I(n+1))−$\tan^{-1}$ (Q(n)/I(n))) are computed in step 83. The length of the array will be (N−1) here for GSM. The phase/angle difference of the two succeeding samples is evaluated and the result is modulo-π corrected in order to avoid wrap around problems.

(2.b) Predefined Data Sequence (SF+TSC+SF) Search:

The wireless terminal receiver searches 84 the TSC sequence number present in received burst data. The receiver takes each of the pre-stored TSC sequence template data (Ref_Angle_TSC_n[ ]) and may then compute the correlation value for that using the below computation method. Like this it slides over the entire received burst data. That means for one TSC data, it searches from the start of the burst to the end of the burst. Then the receiver of the wireless terminal determines in step 85 the maximum correlation value found over the burst data for that TSC, e.g. TSC#n. The same is repeated for other 7 TSC sequence template data. Then among these the highest one is considered as the most correlated sequence. That means that sequence is present in the burst. Also, the location where the max peak is for that sequence is detected, which gives the TSC start location. From the TSC start location the slot start position is derived.

An example of correlation value computation method is provided as:

E.g. X[20] is the Ref_Angle_Diff′′′[20], template angle data for TSC_m, and e.g. Y[20] is the Rx_Angle_Diff[20] for the received data.

Corr=Covariance/(standard deviation of X[20]*standard deviation of Y[20])

Covariance=$(1/N)\cdot(\Sigma_{i=0}^{N=20}(x[i]-x\text{mean})\cdot\Sigma_{i=0}^{N=20}(y[i]-y\text{mean})$ Standard deviation=$1/N\cdot\Sigma_{i=0}^{N=20}(x[i]-x\text{mean})^2$ N=20 here as 20 angles are used for comparison and 'i' varies from 0 to 20. Then it slides over the burst (e.g. over 156 sample pair angles).

In a burst, whichever position provides highest corr (+ve) is selected and the same is done for all 8 TSCs, and among the 8 corr values (from 8 TSCs) the highest one is selected as the most correlated value. The training sequence number (TSC number) corresponding to the most correlated value is selected as the detected training sequence and also the TSC start location is derived as shown in FIG. 4F.

Once the TSC position is detected in the received samples, then it is known wherein a burst the TSC bits starts, as shown in FIG. 4F (TSC time offset from burst boundary), which is 3+57+1=61, which means from 61th location the TSC will start in NB. As that position is now known, the wireless terminal will derive the time slot (e.g. NB start location) start position. Then onwards, the wireless terminal may adjust the time window accordingly, which means search the TSC sequence number around the expected location of the TSC sequence data in the next slot's received data. That means if the first TSC is detected at location L, then TSC in the next slot will be located at ~L+156 location. The wireless terminal can thus search the TSC sequence around that location, for search optimization process.

In a GSM simulator, the above example for detecting the presence of TSC number has been implemented and which detects the presence of TSC number in the received burst data. First it checks if FCCH or SCH is present or not, if not then it searches for the TSC number compared to the pre-stored template.

Once the TSC number is identified, then the repetition of different identified TSC numbers over the TDMA frames are analyzed. If a detected TSC numbers repeats mandatorily over every alternate frames e.g. even slots only at 0, 2, 4, 6, 0, 2, 4, 6 . . . , or 0, 4, 0, . . . or 0, 6, 0 . . . or 0, 2, 4, 0, . . . or only in odd slots like-1, 3, 5, 7, 1, . . . , or 1, 3, 1, . . . or 1, 5, 1, . . . , or 1, 7, 1, . . . like that. Then it can be concluded the CCCH/BCCH or the 51-multi-frame, slot#0, will be appearing in the even numbered slots or in the odd numbered slots. Then based on that those slots, even or odd, are used for searching FCCH and SCH data and other remaining slots over the frame are used for performing reception for any other activities.

Here, the worst case GSM RAT measurement time may now be 17 slots.

17 slots are taken, since in 1 frame at least one of CCCH/BCCH/FCCH/SCH/SDCCH/SACH, which template patterns will be 26+2=28 bits fixed, will exist if it is a cell broadcast frequency. If extended BCCH/CCCH is not used then at least one occurrence will be found. The same will be repeated in $2^{nd}$ slot. At least two repetitions of the known fixed pattern will thus exist. If extended CCCH/BCCH is used, then in every alternate slot this pattern may be found. Thus, if 2 frames e.g. 16 slots and one extra slots to absorb any time offset, is taken then it will be sufficient to identify the channel pattern.

Total time spent for detection will then be 17 slots=9.8 ms. Earlier methods uses 88 slots, i.e. around 50 ms. The time gain is thus about 40 ms for every search.

Once the appearance of the predefined logical channel pattern over the TDMA frame structure is known, which alternate slots is the possible slot where 51 multi-frame will be lying, i.e. FCCH/SCH will be there, the wireless terminal will no longer require continuous reception for BSIC, e.g. SCH reading. Rather it may go for slotted approach, e.g. open even slots as detected for SCH reception and odd slots for RSSI measurement or BSIC reconfirmation, or vice versa. They may run in parallel. Within any specified time limit all the GSM measurements may thus be performed. Also, as the timing of slot pattern is known, if in one occurrence SCH is not found then the same repeat pattern will be continued in the next measurement occasion for that cell frequency. This will save lot of measurement time and decrease the burden of reserving the RF circuit for measurements.

Advantages

The embodiments presented herein thus provide fast detection of the cell broadcast frequency and the wireless terminal can quickly detect whether the tuned frequency is a cell broadcast frequency or traffic frequency. That saves the searching time for FCCH and SCH during the cell search process, when the wireless terminal is already camped or connected to other RATs.

The GSM cell search process may be reduced up to 5 times, in best case, by skipping the TCH (Traffic Channel) frequencies in the ordered RSSI list, especially when the carrier frequency is a traffic or BCCH that is not known.

In a multi-RAT network the presence of a GSM cell is quickly identified by identifying the presence of a GSM cell broadcast frequency. This will be useful for detecting the legacy GSM network existence when there is no LTE or HSPA coverage, especially in CSFB (Circuit Switched Fall-Back) situations.

Additionally, quick detection of the time slot boundary may be obtained as the predefined logical channel pattern (eg. TSC pattern) is found and from that the time slot start position is derived, e.g. slot boundary detection.

The logical channel repetition pattern may be identified and detect where the FCCH or SCH channels will be appearing in that broadcast frequency. The RF circuit needs thus not be used or opened continuously for searching the FCCH or SCH. Rather it may be used in a slotted approach after knowing the possible repeat pattern. The wireless terminal may now schedule those expected slots for FCCH/SCH and the remaining slots may be used to complete the other measurement related tasks like RSSI measurement and BSIC reconfirmation. Further, this will also lead to lower power consumption.

Since continuous RF circuit use is not necessary for SCH reading and hence for BSIC identification, the GSM measurement can now be performed over very short time gaps, like the requirement existing in HSPA DRX today.

Further, once the slot structure, where FCCH/SCH will appear, is known, even a single slot (577 μs) worth of measurement time is useful for GSM to use for measurement. Thus, if there is time gap of only 1 ms, as there is in the WCDMA/LTE RAT, then it can be used now also for GSM measurements. That makes GSM measurement easier, and may also be used during the GSM blind handover (asynchronous handover) in I-RAT HO (handover) scenarios.

A method for Global System for Mobile communications, GSM, cell searches, is presented in FIGS. 4A-4D. The method is performed in a wireless terminal 1 of a cellular network when the wireless terminal is active in a non-GSM radio access technology and comprising the steps of:

scheduling 40 reception of a part of a frame burst of a GSM frequency in the cellular network for the wireless terminal 1; and searching 41 digital samples received on the GSM frequency for a predefined logical channel pattern.

The method may further comprise the step of determining 42 if the GSM frequency is a cell GSM broadcast frequency or if the GSM frequency is a cell GSM traffic frequency, wherein the GSM frequency is determined to be a cell GSM broadcast frequency when a predefined logical channel pattern is identified in the received digital samples (Yes branch from block 42). The GSM frequency is determined to be a cell GSM traffic frequency when no predefined logical channel pattern is identified in the received digital samples (No branch from block 42).

An alternative method may be used for GSM cell searches, when I-RAT scenarios are present, which is exemplified in FIG. 4D. When the wireless terminal 1 receives a BA list, it will immediately know that all frequencies in the list are broadcast frequencies, and can therefor directly schedule reception of a part of a frame burst of a GSM frequency and search digital samples received for a predefined logical channel pattern to identify the #0 slot position of the time frame.

The scheduling 40 may comprise reception of at most 20 slots, or of at most 17 slots.

As illustrated in FIGS. 4B and 4C, the method may further comprise the step of discontinuing 43, 44 the reception of a part of a frame burst of a GSM frequency when the GSM frequency is determined to be a cell GSM broadcast frequency or is determined to be a cell GSM traffic frequency.

As illustrated in FIGS. 4B and 4C, the method may further comprise the steps of: identifying 45 a Synchronization Channel, SCH, for the GSM frequency when a predefined logical channel pattern thereof is identified; and scheduling 46 reception only of a SCH and a Frequency Correction Channel, FCCH, for the GSM frequency for monitoring thereof.

The method may further comprise the step of identifying a predefined logical channel pattern of a Frequency Correction Channel, FCCH, which may be performed by a FCCH search algorithm.

The method may further comprise the step of identifying a predefined logical channel pattern of a Synchronization Channel, SCH, which may be performed by a SCH 64 bits unique SB TSC pattern search.

Figure 7:
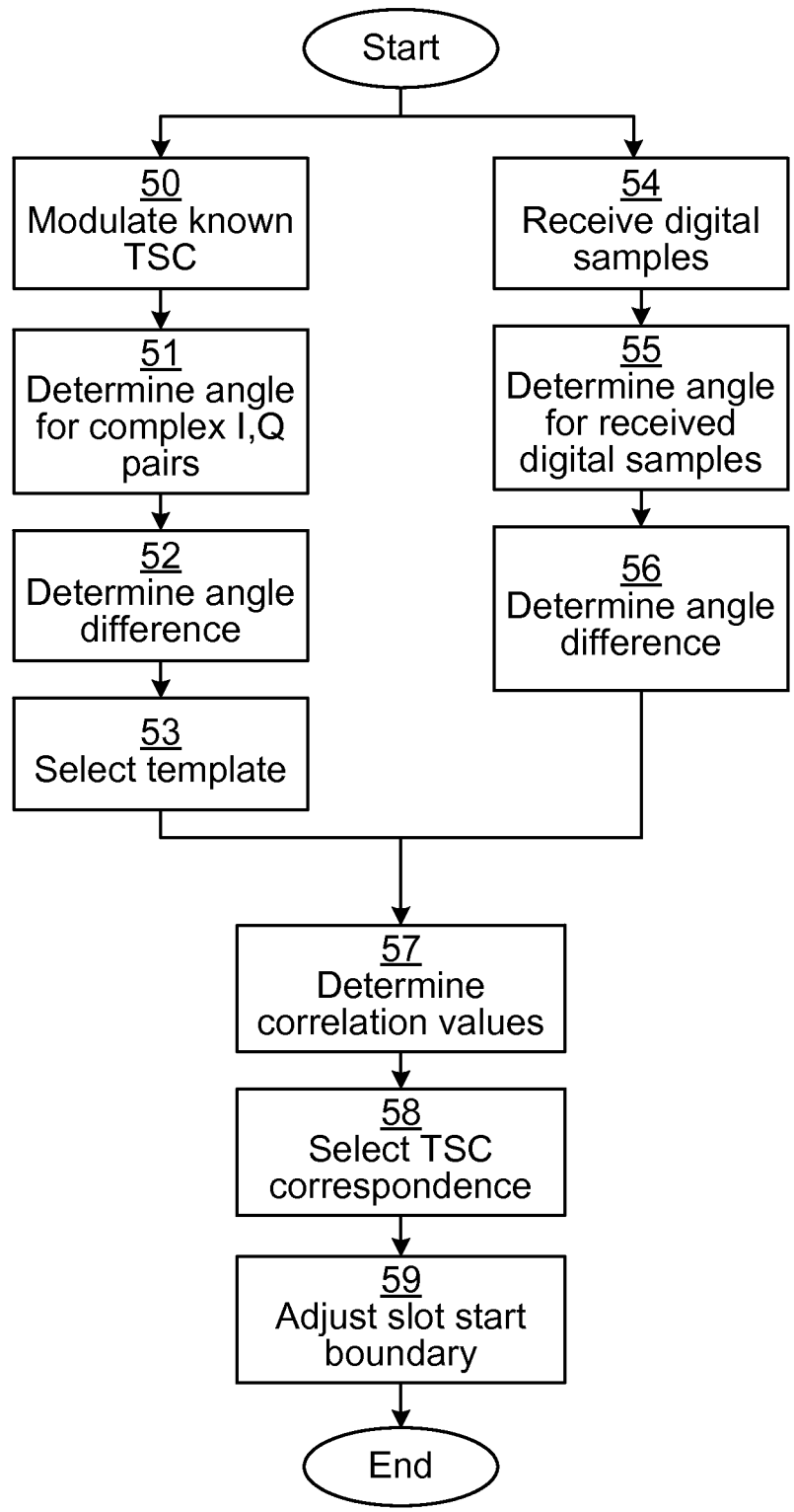
FIG. 7 is a flow chart illustrating a method for an embodiments presented herein.

As illustrated in FIG. 7, the method may further comprise the step of identifying a predefined logical channel pattern of a pre-stored template, which may comprise the steps of:

modulating 50 eight known Training Sequence Codes, TSC, by Gaussian filtered Minimum Shift Keying, GMSK;

determining 51 an angle for each complex I,Q pairs of the eight known TSC;

determining 52 difference in angle between each successive angle of the eight known TSC;

selecting 53 an angle difference template for each of the eight TSC, based on maximum correlation of difference in angle thereof;

receiving 54 digital samples;

determining 55 an angle for each complex I,Q pairs of received digital samples;

determining 56 difference in angle between each successive angle of the received digital samples;

determining 57 a maximum correlation between the difference in angle of the received digital samples and each of the angle difference templates;

selecting 58 a TSC based on the determining 57; and adjusting 59 a slot start boundary according to an identified time-offset from a TSC start location.

The pre-stored template may comprise 28 bits I,Q modulated data of eight Training Sequence Codes, TSC, and two zero bits.

The step of identifying a predefined logical channel pattern of a pre-stored template may comprise the step of checking a repetition of the identified predefined logical channel pattern.

The step of identifying a predefined logical channel pattern may comprise identifying FCCH, SCH and pre-stored template in parallel.

The method may further comprise the step determining when to schedule reception of a desired logical channel which the wireless terminal is required to decode, which may be SCH.

FIG. 5 is a schematic diagram showing some components of the wireless terminal 1. A processor circuit 30 is provided using any combination of one or more of a suitable central processing unit (CPU), multiprocessor, microcontroller, digital signal processor (DSP), application specific integrated circuit etc., capable of executing software instructions 64 stored in a memory 62. The memory can thus be considered to be or form part of a computer program product. The processor circuit 30 may be configured to execute the method described with reference to FIGS. 4A-4D above.

The memory 62 can be any combination of read and write memory (RAM) and read only memory (ROM). The memory 62 also comprises persistent storage, which, for example, can be any single one or combination of magnetic memory, optical memory, solid state memory or even remotely mounted memory.

A data memory 63 may also be provided, e.g. for reading and/or storing data during execution of software instructions in the processor circuit 30. The data memory can be any combination of read and write memory (RAM) and read only memory (ROM) and may also comprise persistent storage, which, for example, can be any single one or combination of magnetic memory, optical memory, solid state memory or even remotely mounted memory. The data memory 63 can e.g. hold other software instruction 65, to improve functionality for the wireless terminal 1.

The wireless terminal 1 further comprises an I/O interface 61 including e.g. a user interface, RF circuitry 66 and baseband circuitry 67. Other components of the wireless terminal 1 are omitted in order not to obscure the concepts presented herein.

Figure 6:
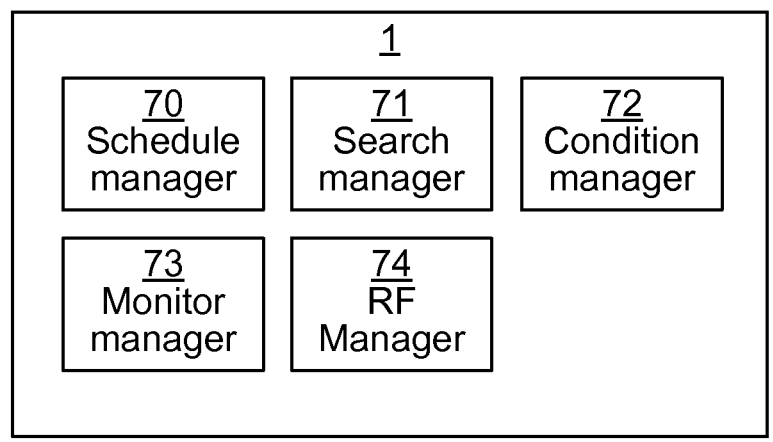
FIG. 6 is a schematic diagram showing functional modules of a wireless terminal.

FIG. 6 is a schematic diagram showing functional modules of the wireless terminal 1. The modules can be implemented using software instructions such as a computer program executing in the wireless terminal 1 and/or using hardware, such as application specific integrated circuits, field programmable gate arrays, discrete logical components, transceivers, etc. or as a combination thereof. The modules correspond to the steps in the methods illustrated in FIGS. 4A-4D. The functional blocks illustrated in FIG. 6, for the wireless terminal 1, are comprising a schedule manager 70, a search manager 71, a condition manager 72, a monitor manager 73 and an RF manager 74.

The schedule manager 70 is arranged to scheduling of reception of a part of a frame burst of a GSM frequency in the cellular network for the wireless terminal 1. This module corresponds to the schedule reception step 40 of FIGS. 4A-D. This module can e.g. be implemented by the processor circuit 30 of FIG. 5.

The search manager 71 is arranged to search digital samples received on the GSM frequency. This module corresponds to the search digital samples received 41 of FIGS. 4A-4D. This module can e.g. be implemented by the processor circuit 30 of FIG. 5.

The condition manager 72 is arranged to determine 42 if a broadcast or traffic frequency is received. This module corresponds to the determine broadcast or traffic frequency step 42 of FIGS. 4B-4D. This module also corresponds to the steps of FB burst detected, SB burst detected, and logical channel pattern identified from the TSC repeat pattern over the slots of FIG. 4C. This module can e.g. be implemented by the processor circuit 30 of FIG. 5 The monitor manager 73 is arranged to determine when to schedule reception of a desired logical channel which the wireless terminal is required to decode. This module corresponds to the schedule reception step 46 of FIGS. 4B-4D. This module also corresponds to the steps discontinue 43, 44 and identify pattern 45 of FIG. 4B. This module can e.g. be implemented by the processor circuit 30 of FIG. 5.

The RF manager 73 is arranged to handle RF signals, which the wireless terminal receives. This module can e.g. be implemented by the RF circuitry 66 and baseband circuitry 67 of FIG. 5.

Figure 8:
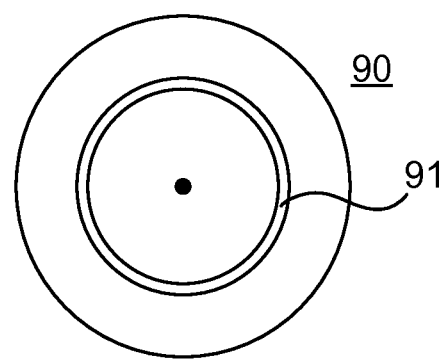
FIG. 8 shows one example of a computer program product comprising computer readable means.

FIG. 8 shows one example of a computer program product 90o comprising computer readable means. On this computer readable means a computer program 91 can be stored, which computer program can cause a processor circuit to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 62 of FIG. 5 or as a removable solid state memory, e.g. a flash storage memory. While the computer program 91 is here schematically shown as a track on the depicted optical disk, the computer program can be stored in any way which is suitable for the computer program product.

ITEMIZED LISTING OF EMBODIMENTS

Embodiment I

The wireless terminal 1 for a cellular network is arranged to perform GSM cell searches when the wireless terminal 1 is active in a non-GSM radio access technology. The wireless terminal 1 comprises:
- a schedule manager 70 configured to schedule 40 reception of a part of a frame burst of a GSM frequency in the cellular network for the wireless terminal 1; and
- a search manager 71 configured to search 41 digital samples received on the GSM frequency for a predefined logical channel pattern.

Embodiment II

The wireless terminal 1 according to embodiment I, further comprising a condition manager 72 configured to determine 42 if the GSM frequency is a cell GSM broadcast frequency or if the GSM frequency is a cell GSM traffic frequency, wherein the GSM frequency is determined to be a cell GSM broadcast frequency when the predefined logical channel pattern is identified in the received digital samples and the GSM frequency is determined to be a cell GSM traffic frequency when no predefined logical channel pattern is identified in the received digital samples.

Embodiment III

The wireless terminal 1 according to embodiment I or II, wherein said schedule manager 70 is configured to schedule 40 reception of at most 20 slots.

Embodiment IV

The wireless terminal 1 according to embodiment III, wherein said schedule manager 70 is configured to schedule 40 reception of at most 17 slots.

Embodiment V

The wireless terminal 1 according to any one of embodiments I-IV, wherein said schedule manager 70 is configured to discontinue 43, 44 said reception of a part of a frame burst of a GSM frequency when said GSM frequency is determined to be a cell GSM broadcast frequency or is determined to be a cell GSM traffic frequency.

Embodiment VI

The wireless terminal 1 according to any one of embodiments I-V, wherein said condition manager 72 is configured to:
- identify 45 a Synchronization Channel, SCH, for said GSM frequency when a predefined logical channel pattern thereof is identified; and
- schedule 46 reception only of a SCH and a Frequency Correction Channel, FCCH, for said GSM frequency for monitoring thereof.

Embodiment VII

The wireless terminal 1 according to any one of embodiments I-VI, wherein said condition manager 72 is configured to identify a predefined logical channel pattern of a Frequency Correction Channel, FCCH.

Embodiment VIII

The wireless terminal 1 according to embodiment VII, wherein said identify a predefined logical channel pattern of a FCCH is performed by a FCCH search algorithm.

Embodiment IX

The wireless terminal 1 according to any one of embodiments I-VIII, wherein said condition manager 72 is configured to: identify a predefined logical channel pattern of a Synchronization Channel, SCH.

Embodiment X

The wireless terminal 1 according to embodiment IX, wherein said identify a predefined logical channel pattern of a SCH is performed by a SCH 64 bits unique SB TSC pattern search.

Embodiment XI

The wireless terminal 1 according to any one of embodiments I-X, wherein said condition manager 72 is configured to identify a predefined logical channel pattern of a pre-stored template.

Embodiment XII

The wireless terminal 1 according to embodiment XI, wherein said condition manager 72 is configured to:
modulate 50 eight known Training Sequence Codes, TSC, by Gaussian filtered Minimum Shift Keying, GMSK;
determine 51 an angle for each complex I,Q pairs of said eight known TSC;
determine 52 difference in angle between each successive angle of said eight known TSC;
select 53 an angle difference template for each of said eight TSC, based on maximum correlation of difference in angle thereof;
receive 54 digital samples;
determine 55 an angle for each complex I,Q pairs of received digital samples;
determine 56 difference in angle between each successive angle of said received digital samples;
determine 57 a maximum correlation between said difference in angle of said received digital samples and each of the angle difference templates;
select 58 a TSC based on said determine 57; and
adjust 59 a slot start boundary according to an identified time-offset from the TSC start location.

Embodiment XIII

The wireless terminal 1 according to embodiment XI or XII, wherein said pre-stored template comprises 28 bits I,Q modulated data of eight Training Sequence Codes, TSC, and two zero bits.

Embodiment XIV

The wireless terminal 1 according to embodiment XI, XII or XIII, wherein said condition manager 72 is configured to check a repetition of the identified predefined logical channel pattern.

Embodiment XV

The wireless terminal 1 according to any one of embodiments I-XIV, wherein said condition manager 72 is configured to identify according to embodiments VI, VIII and X in parallel.

Embodiment XVI

The wireless terminal according to any one of embodiments I-XV, comprising a monitor manager 73 configured to determine when to schedule reception of a desired logical channel which said wireless terminal is required to decode.

Embodiment XVII

The wireless terminal according to embodiment XVI, wherein said desired logical channel is SCH.

The solutions have mainly been described above with reference to a few embodiments. However, as is readily appreciated by a person skilled in the art, other embodiments than the ones disclosed above are equally possible within the scope of the invention.

The invention claimed is:

1. A method for Global System for Mobile communications (GSM) cell searches, the method being performed in a wireless terminal of a cellular network when said wireless terminal is active in a non-GSM radio access technology and comprising:
scheduling reception of a GSM frequency in said cellular network for said wireless terminal;
searching for a predefined logical channel I,Q data pattern in digital samples received during said scheduled reception on said GSM frequency; and
using information about whether the predefined logical channel I,Q data pattern has been found as a basis for controlling one or more further GSM cell search actions,
wherein said step of scheduling comprises reception of fewer than 11 frames,
wherein said step of searching comprises searching in the received fewer than 11 frames, and
wherein the predefined logical channel I,Q data pattern does not represent any of a Frequency Correction Channel (FCCH) and a Synchronization Channel (SCH).

2. The method according to claim 1, further comprising:
determining if said GSM frequency is a cell GSM broadcast frequency or if said GSM frequency is a cell GSM traffic frequency wherein said GSM frequency is determined to be a cell GSM broadcast frequency when said predefined logical channel I,Q data pattern is identified in the received digital samples and said GSM frequency is determined to be a cell GSM traffic frequency when no predefined logical channel I,Q data pattern is identified in the received digital samples.

3. The method according to claim 1, wherein said step of scheduling comprises reception of at most 20 slots.

4. The method according to claim 3, wherein said step of scheduling comprises reception of at most 17 slots.

5. The method according to claim 1 further comprising:
discontinuing said reception of the GSM frequency when said GSM frequency is determined to be a cell GSM broadcast frequency or is determined to be a cell GSM traffic frequency.

6. The method according to claim 1, further comprising:
identifying a Synchronization Channel (SCH) for said GSM frequency when a predefined logical channel I,Q data pattern thereof is identified; and
scheduling reception only of a SCH and a Frequency Correction Channel (FCCH) for said GSM frequency for monitoring thereof.

7. The method according to claim 1, further comprising:
identifying a predefined logical channel I,Q data pattern of a Frequency Correction Channel (FCCH).

8. The method according to claim 7, wherein said step of identifying a predefined logical channel I,Q data pattern of a FCCH is performed by a FCCH search algorithm.

9. The method according to claim 1, further comprising:
identifying a predefined logical channel I,Q data pattern of a Synchronization Channel (SCH).

10. The method according to claim 9, wherein said step of identifying a predefined logical channel I,Q data pattern of a SCH is performed by a SCH 64 bits unique synchronization burst (SB) Training Sequence Code (TSC) pattern search.

11. The method according to claim 1, further comprising:
identifying a predefined logical channel I,Q data pattern of a pre-stored template.

12. The method according to claim 11, wherein said step of identifying comprises:
modulating eight known Training Sequence Codes (TSC) by Gaussian filtered Minimum Shift Keying (GMSK);
determining an angle for each complex I,Q pairs of said eight known TSC;
determining difference in angle between each successive angle of said eight known TSC;
selecting an angle difference template for each of said eight TSC, based on maximum correlation of difference in angle thereof;
receiving digital samples;
determining an angle for each complex I,Q pairs of received digital samples;
determining difference in angle between each successive angle of said received digital samples;
determining a maximum correlation between said difference in angle of said received digital samples and each of the angle difference templates;
selecting a TSC based on said determined maximum correlation between said difference in angle of said received digital samples and each of the angle difference templates; and
adjusting a slot start boundary according to an identified time-offset from a TSC start location.

13. The method according to claim 11, wherein said pre-stored template comprises 28 bits I,Q modulated data of eight Training Sequence Codes (TSC) and two zero bits.

14. The method according to claim 11, wherein said step of identifying a predefined logical channel I,Q data pattern of a pre-stored template comprises the step of checking a repetition of the identified predefined logical channel I,Q data pattern.

15. The method according to claim 11, wherein said step of identifying a predefined logical channel I,Q data pattern comprises performing, in parallel,
identifying a predefined logical channel I,Q data pattern of a Frequency Correction Channel (FCCH);
identifying a predefined logical channel I,Q data pattern of a Synchronization Channel (SCH); and
identifying a predefined logical channel I,Q data pattern of a pre-stored template.

16. The method according to claim 1, further comprising:
determining when to schedule reception of a desired logical channel which said wireless terminal is required to decode.

17. The method according to claim 16, wherein said desired logical channel is Synchronization Channel (SCH).

18. A wireless terminal for a cellular network, said wireless terminal arranged to perform Global System for Mobile communications (GSM) cell searches when said wireless terminal is active in a non-GSM radio access technology, the wireless terminal comprising:
a processor circuit; and
a computer program product storing instructions that, when executed by the processor circuit, causes the wireless terminal to:
schedule reception of a GSM frequency in said cellular network for said wireless terminal;
search for a predefined logical channel I,Q data pattern in digital samples received during said scheduled reception on said GSM frequency; and
use information about whether the predefined logical channel I,Q data pattern has been found as a basis for controlling one or more further GSM cell search actions,
wherein said step of scheduling comprises reception of fewer than 11 frames,
wherein said searching comprises searching in the received fewer than 11 frames, and
wherein the predefined logical channel I,Q data pattern does not represent any of a Frequency Correction Channel (FCCH) and a Synchronization Channel (SCH).

19. The wireless terminal according to claim 18, wherein said instructions comprises a further instruction to:
determine if said GSM frequency is a cell GSM broadcast frequency or if said GSM frequency is a cell GSM traffic frequency, wherein said GSM frequency is determined to be a cell GSM broadcast frequency when a predefined logical channel I,Q data pattern is identified in the received digital samples and said GSM frequency is determined to be a cell GSM traffic frequency when no predefined logical channel I,Q data pattern is identified in the received digital samples.

20. The wireless terminal according to claim 18, wherein said instruction to schedule comprises reception of at most 20 slots.

21. The wireless terminal according to claim 20, wherein said instruction to schedule comprises reception of at most 17 slots.

22. The wireless terminal according to claim 18, wherein the instructions comprise a further instruction to:
discontinue said reception of the GSM frequency when said GSM frequency is determined to be a cell GSM broadcast frequency or is determined to be a cell GSM traffic frequency.

23. The wireless terminal according to claim 18, wherein the instructions comprise further instructions to:
identify a Synchronization Channel (SCH) for said GSM frequency when a predefined logical channel I,Q data pattern thereof is identified; and
schedule reception only of a SCH and a Frequency Correction Channel (FCCH) for said GSM frequency for monitoring thereof.

24. The wireless terminal according to claim 18, wherein the instructions comprise a further instruction to:
identify a predefined logical channel I,Q data pattern of a Frequency Correction Channel (FCCH).

25. The wireless terminal according to claim 24, wherein said instruction to identify a predefined logical channel I,Q data pattern of a FCCH is performed by a FCCH search algorithm.

26. The wireless terminal according to claim 18, wherein the instructions comprise a further instruction to:
identify a predefined logical channel I,Q data pattern of a Synchronization Channel (SCH).

27. The wireless terminal according to claim 26, wherein said instruction to identify a predefined logical channel I,Q data pattern of a SCH is performed by a SCH 64 bits unique synchronization burst (SB) Training Sequence Code (TSC) pattern search.

28. The wireless terminal according to claim 18, wherein the instructions comprise a further instruction to:
identify a predefined logical channel I,Q data pattern of a pre-stored template.

29. The wireless terminal according to claim 28, wherein said instruction to identify a predefined logical channel I,Q data pattern comprises the instructions to:

modulate eight known Training Sequence Codes (TSC) by Gaussian filtered Minimum Shift Keying (GMSK);

determine an angle for each complex I,Q pairs of said eight known TSC;

determine difference in angle between each successive angle of said eight known TSC;

select an angle difference template for each of said eight TSC, based on maximum correlation of difference in angle thereof;

receive digital samples;

determine an angle for each complex I,Q pairs of received digital samples;

determine difference in angle between each successive angle of said received digital samples;

determine a maximum correlation between said difference in angle of said received digital samples and each of the angle difference templates;

select a TSC based on said determined maximum correlation between said difference in angle of said received digital samples and each of the angle difference templates; and adjust a slot start boundary according to an identified time-offset from the TSC start location.

30. The wireless terminal according to claim 28, wherein said pre-stored template comprises 28 bits I,Q modulated data of eight Training Sequence Codes (TSC) and two zero bits.

31. The wireless terminal according to claim 28, wherein said instruction to identify a predefined logical channel I,Q data pattern of a pre-stored template comprises the step of checking a repetition of the identified predefined logical channel I,Q data pattern.

32. The wireless terminal according to claim 28, wherein said instruction to identify a predefined logical channel I,Q data pattern comprises an instruction to perform, in parallel, identifying a predefined logical channel I,Q data pattern of a Frequency Correction Channel (FCCH);

identifying a predefined logical channel I,Q data pattern of a Synchronization Channel (SCH); and identifying a predefined logical channel I,Q data pattern of a pre-stored template.

33. The wireless terminal according to claim 18, wherein the instruction comprises a further instruction to:

determine when to schedule reception of a desired logical channel which said wireless terminal is required to decode.

34. The wireless terminal according to claim 33, wherein said desired logical channel is Synchronization Channel (SCH).

35. A nontransitory computer readable storage medium comprising a computer program for Global System for Mobile communications (GSM) cell searches in a wireless terminal of a cellular network when said wireless terminal is active in a non-GSM radio access technology, the computer program comprising computer program code which, when run on a wireless terminal, causes the wireless terminal to:

schedule reception of a GSM frequency in said cellular network for said wireless terminal;

search for a predefined logical channel I,Q data pattern in digital samples received during said scheduled reception on said GSM frequency; and use information about whether the predefined logical channel I,Q data pattern has been found as a basis for controlling one or more further GSM cell search actions, wherein said scheduling reception comprises reception of fewer than 11 frames, wherein said searching comprises searching in the received fewer than 11 frames, and wherein the predefined logical channel I,Q data pattern does not represent any of a Frequency Correction Channel (FCCH) and a Synchronization Channel (SCH).

* * * * *